(12) United States Patent
Peressini

(10) Patent No.: US 6,418,156 B1
(45) Date of Patent: Jul. 9, 2002

(54) LASER WITH GAIN MEDIUM CONFIGURED TO PROVIDE AN INTEGRATED OPTICAL PUMP CAVITY

(75) Inventor: Eugene R. Peressini, San Juan Capistrano, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/191,210

(22) Filed: Nov. 12, 1998

(51) Int. Cl.[7] .................................................. H01S 3/06
(52) U.S. Cl. .............................. 372/66; 372/70; 372/92
(58) Field of Search ............................ 372/66, 70, 39, 372/69, 92

(56) References Cited

U.S. PATENT DOCUMENTS

| | | | |
|---|---|---|---|
| 3,665,335 A | * 5/1972 | Tomiyasu | ................... 335/306 |
| 4,785,495 A | 11/1988 | Baer | |
| 4,969,155 A | 11/1990 | Kahan | |
| 4,984,246 A | * 1/1991 | Cabaret | ....................... 372/69 |
| 5,091,915 A | 2/1992 | Tatsumi et al. | |
| 5,140,607 A | 8/1992 | Paiva | |
| 5,257,277 A | 10/1993 | Yagi et al. | |
| 5,307,365 A | 4/1994 | Stappaerts et al. | |
| 5,315,612 A | * 5/1994 | Alcock | ........................ 372/69 |
| RE34,729 E | 9/1994 | Sipes, Jr. | |
| 5,349,600 A | 9/1994 | Shinbori et al. | |
| 5,455,838 A | 10/1995 | Heritier et al. | |
| 5,485,482 A | 1/1996 | Selker et al. | |
| 5,521,932 A | 5/1996 | Marshall | |
| 5,546,222 A | 8/1996 | Plaessmann et al. | |
| 5,553,088 A | 9/1996 | Brauch et al. | |
| 5,557,628 A | 9/1996 | Kuba et al. | |
| 5,572,541 A | 11/1996 | Suni | |
| 5,612,969 A | 3/1997 | Dombi | |
| 5,615,043 A | 3/1997 | Plaessmann et al. | |
| 5,619,522 A | 4/1997 | Dube | |
| 5,636,239 A | 6/1997 | Bruesselbach et al. | |
| 5,661,738 A | 8/1997 | Yasui et al. | |
| 5,852,626 A | * 12/1998 | Reed | ........................... 372/103 |
| 6,061,377 A | * 5/2000 | Brassart | ........................ 372/66 |
| 6,094,297 A | * 7/2000 | Injeyan | ........................ 359/345 |
| 6,115,400 A | * 9/2000 | Brown | ......................... 372/93 |
| 6,134,258 A | * 10/2000 | Tulloch | ........................ 372/99 |

* cited by examiner

*Primary Examiner*—Paul Ip
*Assistant Examiner*—Gioacchino Inzirillo
(74) *Attorney, Agent, or Firm*—Colin M. Raufer; Leonard A. Alkov; Glenn H. Lenzen, Jr.

(57) ABSTRACT

An optically-pumped laser having a gain medium configured to provide a low loss, three-dimensional integrated optical pump cavity that substantially confines optical pump radiation within the lasing volume, which is particularly useful for efficiently pumping solid state gain media that has low pump dopant concentration. The integrated pump cavity includes a plurality of boundaries contiguous with the gain medium. An optical pump source such as a laser diode array supplies optical pump radiation that is input into the gain medium through one or more pump cavity windows with a propagation direction transverse to a laser axis defined through the gain medium. In some embodiments, an optical surface is situated opposite the window to approximately recollimate the input pump radiation. The optical pump cavity may be designed to concentrate the optical pump radiation and approximately uniformly pump the entire volume of the lasing medium. In one such embodiment, the pump cavity includes opposing converging surfaces that concentrate the optical pump radiation as it projects along the laser axis. Embodiments are disclosed in which a solid state gain medium has coatings that operate to suppress amplified spontaneous emission ("ASE"). Some embodiments also include heat sinks that directly contact the transverse boundaries and control the temperature distribution within the gain medium in a predetermined manner.

11 Claims, 12 Drawing Sheets

LASER WITH GAIN MEDIUM CONFIGURED TO PROVIDE AN INTEGRATED OPTICAL PUMP CAVITY

BACKGROUND OF THE INVENTION

1. Field of the Invention

The present invention generally relates to optically-pumped lasers, and more particularly, to optically-pumped lasers that have a low pump energy absorption per unit length such as may result from a low pump absorption cross-section and/or a low doping concentration of pump absorptive ions.

2. Description of Related Art

An optically-pumped laser includes a gain medium and an optical pump source that supplies optical pump radiation to the gain medium, where it is converted into a laser emission. Many early optically-pumped lasers utilized high intensity arc lamps that were formed into any suitable shape, such as a linear shape or a helically wrapped configuration. Although these sources emit high intensity light, they are "low radiance" (i.e. they emit over a very large solid angle), and therefore efficiency was greatly improved by using pump cavities to collect and redirect the pump light to illuminate the laser medium. Accordingly, the laser medium generally was configured into a long, thin cylinder with a large side surface area, and its laser axis length was oriented to match the length of the arc lamp that pumped it. Early pump cavities utilized highly reflecting surfaces surrounding both the arc lamp and the laser medium, which collected and redirected the pump light through the side of the laser medium in a multi-pass configuration. Many versions of these so-called "side-pumped" or "transverse-pumped" optical pump cavity geometries were developed and used in laser products.

However, side-pumped laser configurations have many problems, such as conflicting requirements for cooling the laser medium through the medium side surfaces, suppressing parasitic pump cavity oscillations, and controlling the spatial distribution of the optical pump power within the gain medium, while still maintaining a high pump energy absorption efficiency. These problems are particularly difficult when the side-pumped laser medium has a low absorption of pump energy per transverse pass. In order to obtain high pumping efficiency in such low absorption media, the pump energy must be retained by the pump cavity and redirected back through the laser medium many times. When the pump energy losses resulting from the successive interactions with the cooling interface, parasitic suppression, and pump cavity optical systems become excessive, efficient optical pumping of the side-pumped laser medium cannot be achieved and high power laser operation may become impossible.

In more recent times high radiance pump sources such as lasers and diode laser arrays have been developed and utilized as pump sources for many laser media. Because the light from a high radiance source is emitted over a much smaller solid angle than from an extended lamp source, a high radiance pump source can be optically configured into a narrow beam by an optical system. In "end-pumped" or "longitudinal-pumped" configurations, the beam is introduced into the laser medium through one end and then travels along the laser axis down the length of the gain medium together with the laser emission. In some mode matched embodiments of end pumped lasers, the transverse optical pump radiation profile is matched to the desired transverse mode profile of the laser. In embodiments in which most of the pump energy is absorbed during transit along the round trip length of the laser medium (which is usually much larger than the two-pass transverse width of the laser medium), a pump cavity may not be required to attain high pumping efficiency.

However, significant problems render high power operation difficult to achieve in end-pumped configurations. For example, excessive optical power intensities are created due to the fact that end-pumped lasers have a common propagation axis for both the pump and extracted laser beams, combined with the fact that a typical laser diode pump beam has a highly non-uniform transverse intensity distribution. Attempts to design an efficient, practical high power end-pumped laser have encountered problems such as excessive optical power intensity due to the combination of the intensities of the pump and extracted laser beams, severe thermally-induced medium distortion, excessive doping concentration or medium length constraints on design optimization, increased laser resonator optical losses resulting from complex multi-wavelength optical coatings, and spatially non-uniform pumping distributions. These problems are particularly severe for embodiments in which the laser medium exhibits a high pump saturation flux, such as may result from a low pump absorption cross-section.

In addition to these problems, which can limit the performance and increase the complexity of end-pumped laser embodiments, an additional problem arises for an important class of laser media. Specifically, "three-level" or "quasi-three level" laser media exhibit substantial performance benefits when the product of the medium dopant concentration and the active volume is minimized, i.e., when the dopant concentration is low by current standards. This concentration dependence arises due to the requirement that a substantial upper laser level population density must be maintained to overcome the equilibrium lower laser level population density. One such example of a concentration dependent laser material is ytterbium-doped yttrium aluminum garnet ("Yb:YAG"), which has been identified to have potential for use in high power lasers. In order to take advantage of such concentration-sensitive media, end-pumped configurations utilizing diode lasers as the pump source have been proposed. However, such end-pumped configurations have encountered the above-discussed problems, which have restricted scaling them to high average power levels.

In order to quantify and compare the performance limitations of the prior art side pumping and end pumping concepts applied to concentration sensitive laser materials and to provide one measure of performance improvement over prior art which is afforded by the utilization of the present invention, it may be useful to define a concentration figure of merit, $F_c$, for the laser medium, which is obtained by dividing the minimum optical pump radiation focal spot area, $A_f$, by the product of the medium laser axis end area, $A$, the medium dopant concentration, $N_o$, the pump absorption cross-section, $\sigma_p$, and the effective end-pumping medium length, L. Symbolically:

$$F_c = A_f/(AN_o\sigma_p L). \qquad \text{Eq. 1}$$

As used herein, the value of $F_c$ provides a quantitative measure of the highest efficiency and lowest waste energy that can be realized from a given configuration of a concentration-sensitive medium. Generally, a higher $F_c$ indicates that the laser is more efficient, while a lower $F_c$ indicates that the laser is less efficient.

Prior to the conception and reduction to practice of the present invention, after consideration of all prior art shortcomings, it is believed that end-pumped configurations have provided the most efficient and scaleable configurations of concentration-sensitive media lasers such as Yb:YAG. In order to maintain a near optimum level of pump energy absorption in such configurations, the quantity $N_o \sigma_p L$ in the above equation must be approximately equal to 1. Since the minimum value for A is equal to $A_p$, it is apparent that for end-pumping embodiments the largest possible value of the concentration figure of merit is equal to 1, which requires that the optical pump radiation completely fill the medium volume. Such optimum end-pumped configurations can be impractical to implement, and generally must be compromised to a lower $F_c$ value. Furthermore, side-pumped embodiments that use external re-entrant pump cavities have a low pump energy absorption efficiency and/or an $F_c$ value significantly lower than 1.0.

SUMMARY OF THE INVENTION

In order to overcome the limitations of the prior art, the present invention provides an optically-pumped laser having a gain medium configured to provide a low loss, three-dimensional integrated optical pump cavity for injected optical pump radiation. The optical pump cavity re-directs the optical pump radiation throughout the lasing volume in multiple passes, substantially retaining the optical pump radiation within the lasing volume to create an average pump absorption length that can be configured to be much longer than twice the laser axis length, thereby efficiently extracting energy from the optical pump radiation even when very low pump absorptive ion dopant concentration laser media are employed. The integrated pump cavity can be implemented in lasers having a wide range of power levels, from low power lasers to high power lasers that generate one kW or more. Laser embodiments implementing the present invention have been demonstrated to have a high efficiency in converting the input pump energy into laser emission while maintaining uniform pumping distribution. Particularly, some laser embodiments have a concentration Figure of Merit ($F_c$) greater than 1.0, and in some embodiments exceeding 2.0.

An optically-pumped laser apparatus described herein comprises a gain medium that defines an integrated pump cavity having a plurality of boundaries contiguous with said gain medium that are reflective of the pump radiation, and an optical system that defines a laser axis through a first end and a second end of the gain medium, which may also be reflective to the pump radiation. An optical pump source supplies the optical pump radiation, and a beam delivery system is arranged to inject the optical pump radiation through one or more pump cavity windows into the gain medium with a propagation direction that is substantially not collinear with the laser axis. In some embodiments, the boundaries of the integrated pump cavity include all boundaries of the laser medium including those situated transverse to said laser axis, and the integrated pump cavity boundaries are configured so that injected optical pump radiation reflects between them while projecting longitudinally along the laser axis. The optical pump radiation is substantially contained and absorbed by the laser medium within the integrated pump cavity, thereby energizing said gain medium to generate a laser emission along said laser axis.

Many such integrated medium/pump cavity configurations can be implemented. In some embodiments, the optical pump cavity is designed to concentrate the optical pump radiation and uniformly and efficiently pump the entire volume of the lasing medium without significantly compromising the attainable beam quality of the laser beam generated within the lasing volume. In one such embodiment, the pump cavity includes converging surfaces that longitudinally concentrate the optical pump radiation as it projects along the laser axis.

In some embodiments, the gain medium comprises a solid state gain medium that defines a pump cavity including coated boundaries, thereby integrating the pump cavity with the gain medium. The integrated pump cavity is particularly useful for high power solid state lasers. By carefully designing the pump cavity configuration and appropriately choosing the dopant concentration of the active pump ion within the solid state material, high power optical pump radiation can be absorbed approximately evenly throughout the volume, producing heat more uniformly throughout the solid state laser gain medium, which can reduce or substantially eliminate higher order thermal distortion effects that adversely affect other high power optically-pumped lasers. Also, uniform absorption reduces or substantially eliminates potentially destructive hot areas within the gain medium. One embodiment includes a lightly doped (e.g. <1%) solid state laser gain medium such as Yb:YAG, and the integrated pump cavity includes design features to concentrate the intensity of the optical pump radiation. When pumped to optical transparency conditions, the lightly-doped, quasi-three level solid state laser gain medium produces less heat and lower spontaneous emission losses per unit volume than the other, more highly doped crystals that are used in conventional laser designs.

Advantageously, a heat sink can be directly coupled to the transverse surfaces of the solid state gain medium, effectively cooling the gain medium and optical coating formed thereon, even for high power operation. Furthermore, detrimental higher order optical distortion effects are reduced because the product of the transverse temperature gradient and the laser axis medium length is minimized through the use of the integrated pump cavity. Also, because the optical pump radiation propagates substantially orthogonal to the laser axis, coating requirements for the end surfaces are simplified and the total intensity proximate to the laser end surfaces is significantly reduced, thereby reducing cost, increasing performance, and improving manufacturing yield.

The foregoing, together with other objects, features and advantages of this invention, will become more apparent when referring to the following specification, claims and the accompanying drawings.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

Figure 1:
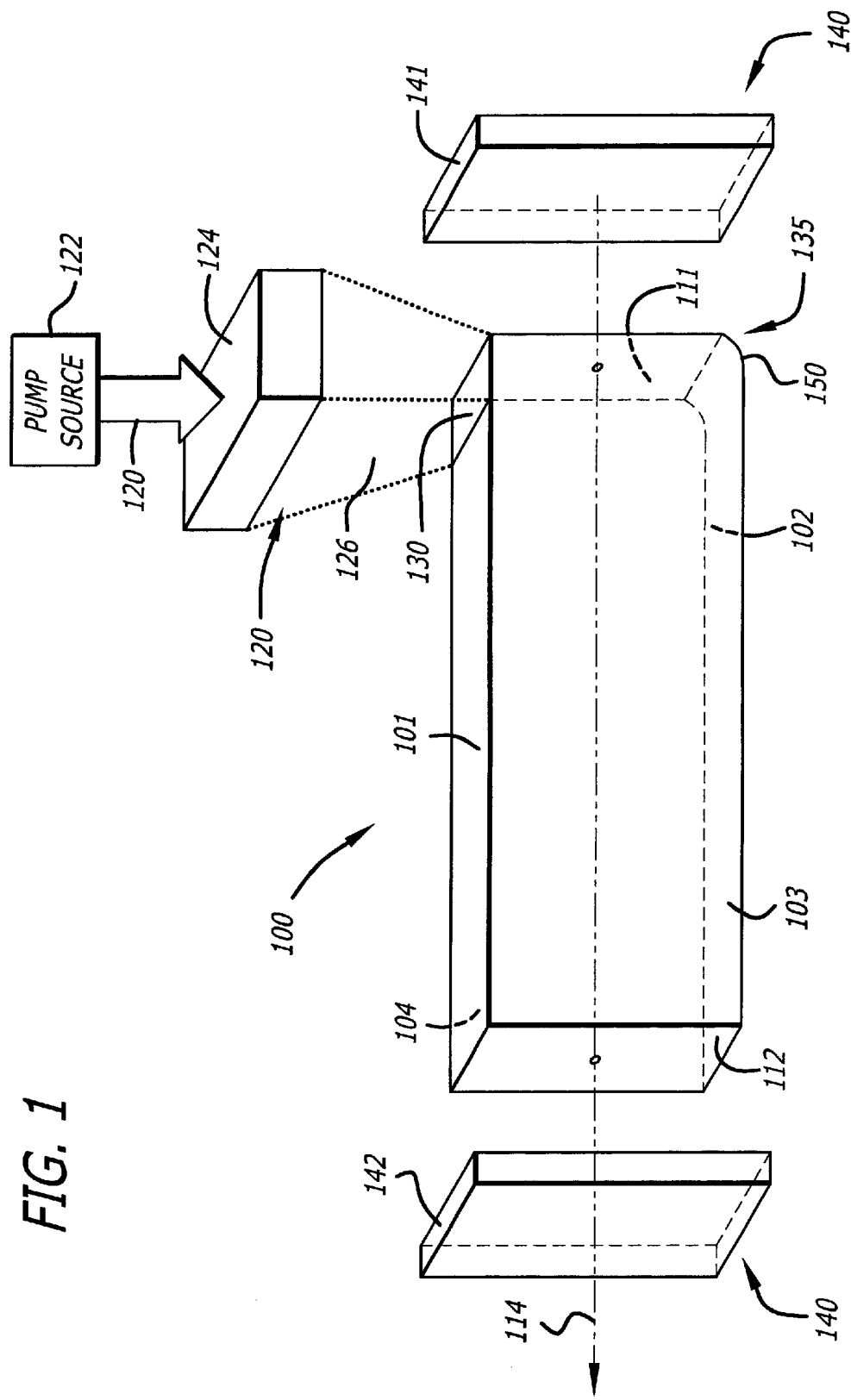
FIG. 1 is a perspective view of one embodiment of an optically-pumped laser including a gain medium and an integrated optical pump cavity defined by the boundaries of the gain medium.

This invention is described in the following description with reference to the Figures, in which like numbers represent the same or similar elements.

As used herein, the angle of incidence of a light ray with a surface is defined with respect to the normal (i.e. perpendicular) to the surface. Light rays incident upon a reflective surface are reflected at an angle that is a function of the angle of incidence. Some surfaces are designed with materials or optical coatings over a range of angles of incidence. However, even if the surface is not designed to be reflective, under certain circumstances an interface between two materials will be reflective to light rays having large angles of incidence, an effect caused by total internal reflection ("TIR"). Specifically, TIR causes a light ray propagating through a material having a high index of refraction to be reflected from an interface with another medium that has a lower index of refraction, if the angle of incidence is larger than a critical angle. The critical angle for TIR is a function of the difference between the indices of refraction of the two materials.

The term "optical radiation" is used herein to describe any light distribution from a light source. Thus, optical radiation may be defined by a collimated beam, it may be defined by a beam such as a diverging or a converging beam, it may be defined by a collection of light rays traveling at different angles and intensities, or it may be defined by a very complex distribution of light rays. For purposes of illustration, the components of optical radiation may be treated as rays, even though the actual distribution may be more complex.

The term "transverse" is used herein to mean "alongside of" (e.g. surfaces transverse to the laser axis), or "from the side" (e.g. transverse rays approach from the side rather than along the laser axis). Transverse rays may be, but are not necessarily perpendicular to the laser axis, and transverse surfaces may be, but are not necessarily parallel to the laser axis.

Some embodiments of the laser assembly described herein integrate a pump cavity with a solid state gain medium that has a three-level or quasi three-level lasing transition, such as Yb:YAG (ytterbium-doped yttrium aluminum garnet). Other embodiments may use other solid state gain media, such as co-doped gain media in which a first ion (a "pump active ion") absorbs energy from the optical pump, and transfers this energy to a second ion (a "lasant ion"), which lases.

In many cases, the use of a three-level or quasi three-level gain medium with a low doping concentration can provide an efficient high power laser. Specifically, "three-level" or "quasi three-level" laser media exhibit substantial performance benefits when the product of the medium dopant concentration and the active volume is minimized. This concentration dependence arises due to the requirement that a substantial upper level population density must be maintained in an operating laser to overcome the equilibrium lower laser level population density. Of course, efficient laser operation is highly desirable: in addition to the energy and cost-saving advantages provided by efficient laser operation, high efficiency can increase laser output power, reduce heat generation, reduce thermal distortion of the laser emission, and extend the useful life of a laser device. Unfortunately, a low doping concentration usually also means that the pump absorption per unit length is low, which makes it difficult for conventional lasers to efficiently absorb the pump radiation and convert it to stored laser energy.

FIG. 1 is a perspective view of an optically-pumped laser apparatus including an approximately rectangular-shaped gain medium 100 with boundaries, which are configured and/or optically coated appropriately, as described elsewhere, that define a three dimensional, integrated optical pump cavity. The medium boundaries that also define the integrated optical pump cavity in FIG. 1 include all side boundaries of the gain medium, including an upper boundary 101 and a lower boundary 102 opposite thereto, a first lateral boundary 103 and a second lateral boundary 104 opposite thereto, and a first end boundary 111 and a second end boundary 112 opposite thereto, thereby forming an integrated unit, or a "container" for optical pump radiation that prevents substantial leakage of input optical pump radiation from the integrated pump cavity. However, in some embodiments, the second end boundary 112 may not actually be a significant part of the pump cavity; for example, the pump cavity may be designed so that the pump radiation will not reach the second end, and/or substantially all the pump radiation may be absorbed before it reaches the second end. Depending upon the specific design for the integrated pump cavity, the upper and lower boundaries, the first and second lateral surfaces, and the first and second end surfaces may be flat and parallel, or flat and non-parallel, or any other configuration that defines a suitable pump radiation distribution within the gain medium.

The gain medium comprises any suitable material and geometric shape. For example, in the embodiment described subsequently with reference to FIG. 3, the gain medium comprises a solid state gain medium doped with a suitable spatial distribution of one or more pump radiation absorptive ions and lasant ions, such as a Yb:YAG crystal, having an approximately rectilinear slab geometric configuration. In alternative embodiments, other suitable gain medium geometric shapes can be utilized, such as approximately circularly cylindrical or elliptically cylindrical shapes. In other alternative embodiments other gain media can be utilized, such as a liquid gain medium or a gaseous gain medium, and in such embodiments the appropriate reflective surfaces may be formed on the immediate boundaries used to contain the liquid or gas. For example, if a gaseous medium is used, optical coatings can be formed on the interior surface of the container that holds the gas.

A laser axis 114 is defined within the gain medium, through the first and/or second ends 111 and 112. Optical pump radiation 120, supplied by any suitable optical pump source 122, is injected into the gain medium in a direction non-parallel with the laser axis 114. The optical pump source comprises any suitable high radiance source, such as laser diodes, laser diode arrays, or other lasers. In operation, the optical pump radiation 120 provides high intensity optical radiation at a wavelength that can be absorbed and converted to upper laser level energy storage within the gain medium. The optically-pumped laser apparatus operates by using the stored, converted pump energy to generate a laser emission within the gain medium.

An optical system 140 is situated on opposite sides of the gain medium, and generally defines an optical extraction system for the laser. The optical system 140 defines an optical energy extraction volume for laser emission within the gain medium, and accordingly, the optical system defines the laser axis 114 by the central lasing path of the energy extraction volume within the gain medium. So defined, the laser axis 114 may be a single straight path through the first and second ends of the gain medium, as illustrated. In alternative embodiments a more complicated laser axis could be defined by multiple paths through the gain medium, which may reflect between boundaries, and may optically interact with any other medium boundary or surface. The optical system 140 includes suitable components in a configuration suitable for its desired purpose, whether it be power extraction, spatial or temporal mode control, and/or waveform control. In some embodiments the first and second optical components may be discrete components such as a first optical element 141 and a second optical element 142 situated on opposite sides of the gain medium. In other embodiments such as a solid state laser, the optical system 140 may comprise coatings formed on the first and/or second ends of the gain medium, and these coatings, together with the shape of the first and second ends (e.g. flat-flat, curved-flat, or curved-curved) define the extraction volume for the solid state gain medium. In one alternative, the optical system 140 defines an optically resonant cavity, in which case the first and second optical elements may comprise first and second end mirrors of a laser resonator or the elements of a ring laser resonator. In another embodiment, the optical system may define a beam path to amplify an externally-generated laser beam (i.e., the gain medium could be used as a one- or multiple-pass amplifier) in which case the first and second optical elements may comprise lenses and/or other beam-shaping elements. In some embodiments, the output beam defined by the optical system could be a single beam, in alternative embodiments multiple beams could be provided. In still other embodiments, two or more slabs of the solid state gain medium 100 can be situated within a single laser resonator, which could be useful to increase output laser power.

A beam delivery system 124 forms the optical pump radiation 120 into one or more beams shown at 126, which are supplied to an integrated pump cavity input window 130 formed proximate to the first end of the gain medium. In alternative embodiments two or more pump cavity windows can be utilized, and they may be positioned appropriately on any gain medium boundary. The pump cavity window 130 has a size large enough to accept the profile of the pump beam(s) 126 but small enough to reduce containment losses of injected pump radiation. In one embodiment, the delivered pump beam profile approximately matches the pump cavity window. In many embodiments, the pump cavity window 130 is coated for anti-reflection and anti-absorption at the wavelength of the optical pump radiation.

The beam delivery system illustrated at block 124 receives the optical radiation from the pump source and directs it through the pump cavity window 130 with an orientation and direction of propagation appropriate to match the selected geometrical configuration of the integrated pump cavity. Accordingly, the beam delivery system includes any appropriate components such as focusing optics, mirrors, optical fibers, or lens ducts to receive the optical radiation, process it as appropriate, and deliver it through the pump cavity window 130 and into the integrated pump cavity. In one embodiment, the beam delivery system 124 focuses the beam of optical pump radiation onto the pump cavity window 130 with an angular spread around a normal angle of incidence, and the beam waist (i.e. the narrowest beam width) is approximately coincident with the pump cavity window, thereby providing high intensity optical radiation. In alternative embodiments the angle of incidence may not be normal, and/or the optical pump radiation may not be focused; for example the optical pump radiation may be provided by a very high radiance source that produces a collimated beam of optical pump radiation, which is injected at an appropriate angle through the pump cavity window 130 in the form of a collimated beam without substantial focusing.

In the embodiment of FIG. 1, as a part of the beam delivery system, a small off-axis cylindrical recollimating reflective surface illustrated generally at 135 is provided opposite the pump cavity window 130 to collimate and deflect the pump beam into the integrated pump cavity with a suitable angular spread. In the embodiment of FIG. 1, the recollimating reflective surface 135 comprises an optical surface 150 formed on the lower boundary 102 opposite the pump cavity window. One advantage of this configuration is that the injected pump radiation can be reflected substantially without loss. However, in another embodiment disclosed subsequently with reference to FIG. 15, an external off-axis cylindrical reflector can be utilized, positioned adjacent to a small anti-reflection coated region of the medium boundary opposite the pump cavity window, which may have manufacturing and cost advantages.

As discussed earlier, the optical pump radiation 120 is injected into the gain medium through the pump cavity window 130 formed on a boundary of the gain medium. In FIG. 1, the pump cavity window 130 is formed proximate to the first end of the gain medium, while in other embodiments the pump cavity window can be formed at another appropriate location. In the embodiment of FIG. 1, the optical surface 150 is situated to reflect and process the optical pump radiation after it is injected through the pump cavity window. As a final optical interface with the beam delivery system 124, this optical surface is useful to control the intensity of a pump beam focused through the pump cavity window, which would otherwise diverge beyond the plane of the pump cavity window. The optical surface 150 includes a curved shape having an optical power to concentrate the optical pump radiation along at least one axis of its propagation and a linear tilt to provide a longitudinal deflection of the input pump beam suitable to match the integrated pump cavity design requirements for the optimum range of injection propagation angles. For example, the curved surface may be off-axis circular or parabolic in a plane parallel with the laser axis, which concentrates the optical pump radiation in that plane. In other embodiments, the curved surface may have a shape to concentrate the injected optical pump radiation along both axes. In one embodiment the optical surface has an off-axis cylindrical shape that approximately collimates and deflects the optical pump radiation from the pump cavity window along the longitudinal axis. As will be described, this particular embodiment can be used to maintain a pump radiation intensity throughout the integrated pump cavity approximately equal to the pump intensity at the plane of the pump cavity window. In still other embodiments the optical surface 150 has a lesser optical power that only reduces the divergence of the injected optical pump radiation. In some embodiments, such as shown in FIGS. 11–14, the optical surface 150 is co-extensive with the unmodified lower boundary, and has substantially zero optical power.

In general, the transverse integrated pump cavity is defined by a low loss, three-dimensional optical structure that reflects the optical pump radiation multiple times at a non-zero angle with respect to the laser axis to produce pump absorption path lengths that can be significantly longer than twice the medium length along the laser axis, and has a configuration to reflect and contain the optical pump radiation within the gain medium, while suppressing amplified spontaneous emission (ASE) and parasitic mode oscillation. In broad terms, the integrated optical pump cavity includes a plurality of reflective surfaces formed contiguous with (i.e. integrated with) the boundaries of the gain medium.

After injection within a suitable range of propagation angles into the integrated pump cavity, the optical pump radiation reflects multiple times within the pump cavity transverse to the laser axis, while projecting longitudinally along the laser axis in a direction away from the first end and toward the second end. As a result, the optical pump radiation pumps the entire length of the gain medium along a total path length that can be significantly longer than the longitudinal length of the gain medium. In some embodiments, any unabsorbed pump energy reaching the second end is reflected back, so that the pump energy is fully utilized. In many embodiments, the unabsorbed pump energy has a large enough angle of incidence with the second end that TIR is sufficient to reflect it back toward the first end. However, in alternative embodiments, other reflective structures could be utilized. It may be noted that the integrated pump cavity directs optical pump radiation across (i.e. transverse to) the extraction volume of the laser emission, and does not follow the laser axis. As a result, the electromagnetic fields of the optical pump radiation and the laser emission do not constructively combine as strongly as for co-linear propagation, which is particularly useful for high power operation.

Furthermore, the laser emission follows the laser axis, and does not significantly interact with the transverse reflective surfaces of the pump cavity. Therefore, as will be described in detail with reference to FIGS. 4, and 5, these transverse reflective surfaces are designed to reflect optical pump radiation and to absorb or otherwise suppress ASE and parasitic mode oscillation. Specifically, as will be described with reference to FIGS. 4, and 5, the integrated pump cavity is designed to take advantage of both angular and spectral reflective differences between the surfaces that transmit or reflect pump radiation and the surfaces that reflect laser emission in order to suppress ASE and parasitic oscillation. Briefly, in one embodiment, the upper and lower boundaries are designed to be substantially reflective of the optical pump radiation over a wide range of angles of incidence about normal incidence, while the first and second lateral boundaries are designed to be substantially reflective only if the angle of incidence is greater than a predetermined angle, which in one embodiment is chosen dependent upon the radiance of the pump source. Generally, a low radiance source (a widely diverging beam) will require a smaller predetermined angle; conversely, a higher radiance source can operate effectively with larger predetermined angles.

One advantage of distributing the optical pump radiation within the integrated pump cavity described herein is that the gain medium can have a low active ion concentration-length product (and hence low absorption per unit path length), which promotes efficient quasi three-level laser operation. A low active ion concentration is possible because pump energy injected into the integrated pump cavity remains substantially confined within the gain medium over absorption path lengths substantially longer than twice the longitudinal length of the gain medium. The containment time of a pump photon within the gain medium, before being absorbed by cavity losses or exiting through the pump cavity window, is defined as the pump cavity photon lifetime, $T_c$. By providing a pump cavity structure that increases $T_c$, more effective utilization can be made of a gain medium having a low active ion concentration.

Reference is now made to FIGS. 1A, 1B, 1C, and 1D in conjunction with FIG. 1, to describe the operation of the pump cavity to reflect and contain the optical pump radiation within the gain medium. For high power embodiments, it is advantageous to provide a high pump intensity distributed throughout the gain medium to provide the energy necessary to support high power operation. The pump cavity window transmits this high intensity pump radiation into the gain medium, and the integrated pump cavity contains and distributes the high intensity pump radiation throughout the gain medium.

The intensity distribution of the optical pump radiation within the integrated pump cavity is determined by a number of factors, including the design of the pump cavity, and the cross-sectional shape, divergence, propagation direction, and intensity distribution of the injected optical pump radiation. Of course, these characteristics will vary between embodiments. In many embodiments, it will be desirable to focus the optical pump radiation from a laser diode array approximately onto the pump cavity window to inject high intensity radiation into the pump cavity. In such embodiments, focused pump radiation from a laser diode array can be considered as an oval cone of diverging light at each point on the pump cavity window, which begins diverging after it passes through the pump cavity window. After the diverging rays pass the window plane, they then reflect off various surfaces of the integrated pump cavity, distributing the optical pump radiation through the gain medium in a complex distribution. Furthermore, in the embodiment of FIG. 1, the optical surface 150 has a curved shape that concentrates the optical pump radiation interacting with it, thereby reducing the divergence of at least some of the injected optical radiation. However in some embodiments, not all of the injected optical pump radiation is reflected from the optical surface 150.

Figure 1A:
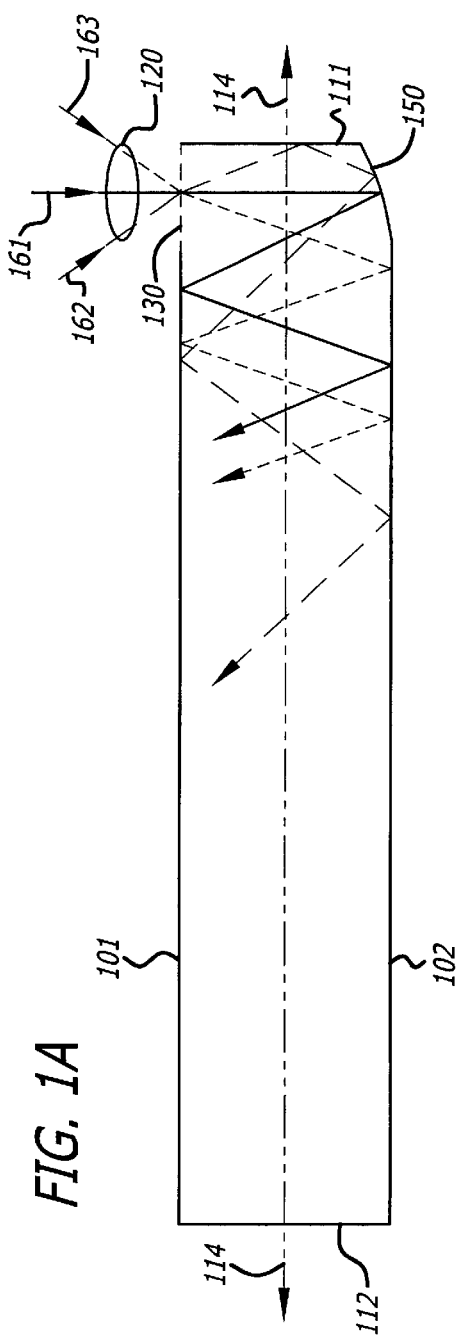
FIG. 1A is a cross-sectional diagram of the optically-pumped laser of FIG. 1 taken longitudinally (i.e. parallel with the laser axis), illustrating longitudinal components of optical pump radiation propagating through a midpoint of the pump cavity window.
Figure 1B:
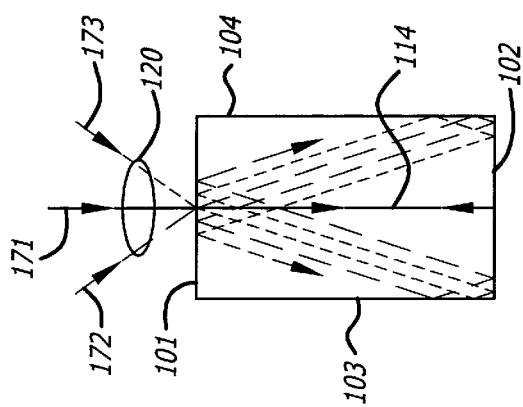
FIG. 1B is a transverse cross-sectional view of the optically-pumped laser of FIG. 1 taken perpendicular to the laser axis, illustrating selected transverse components of the optical pump radiation propagating through a midpoint of the pump cavity window.
Figure 1C:
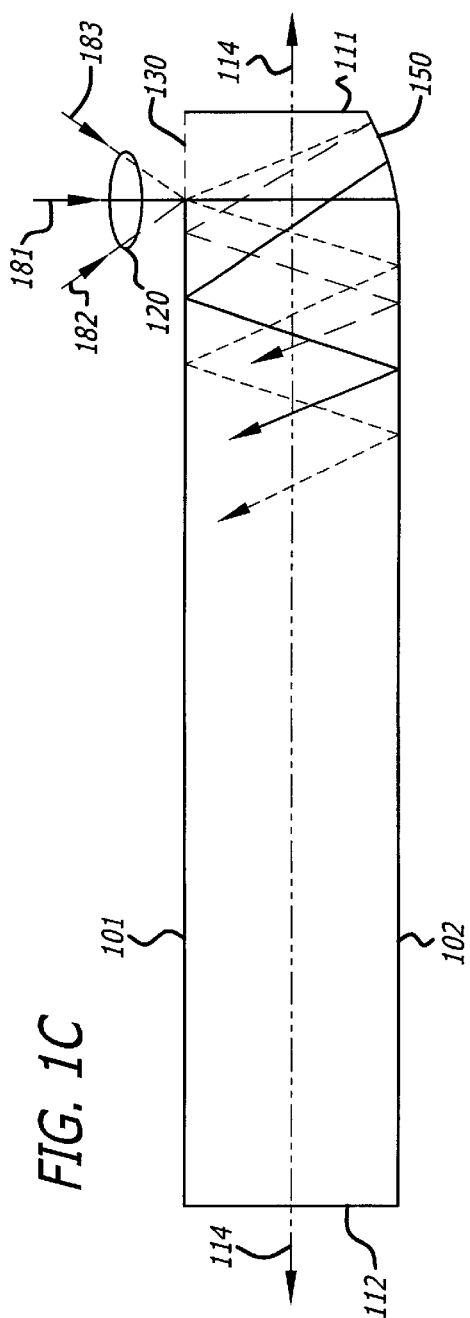
FIG. 1C is a cross-sectional diagram of the optically-pumped laser of FIG. 1 taken longitudinally (i.e. parallel with the laser axis), illustrating selected longitudinal components of the optical pump radiation propagating through the pump cavity window at a point proximate to the upper reflective boundary.
Figure 1D:
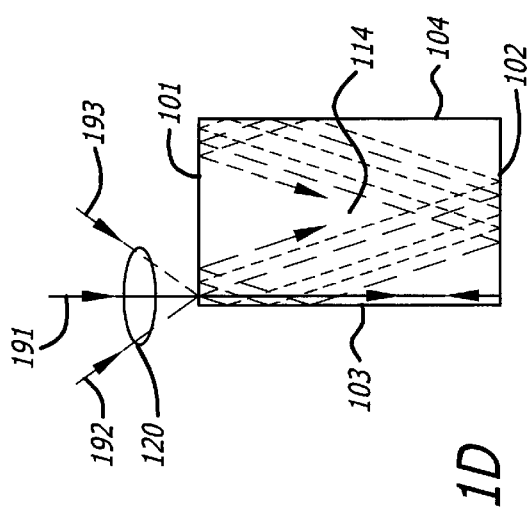
FIG. 1D is a transverse cross-sectional view of the optically-pumped laser of FIG. 1, illustrating selected transverse components of the optical pump radiation propagating through the pump cavity window at a point proximate to the upper reflective boundary.

FIGS. 1A–1D show longitudinal and transverse cross-sectional views of the pump cavity, which illustrate optical pump radiation reflected from reflective boundaries including the upper and lower boundaries 101 and 102, the first and second lateral boundaries 103 and 104, and the first and second end boundaries 111 and 112. In some embodiments, the rays at some boundaries have a angle of incidence large enough to be reflected. due to TIR. In general, each reflection of optical pump radiation has a directional component related to the angle of incidence of the optical pump radiation. The optical pump radiation is illustrated herein in the form of selected geometrical components (i.e. "rays") of optical pump radiation. For purposes of illustration, the optical pump radiation injected into the pump cavity is divided into longitudinal components defined in the plane of the laser axis, and transverse components defined in a plane perpendicular to the laser axis. FIGS. 1A and 1C show exemplary longitudinal components, and FIGS. 1B and 1D show exemplary transverse components. It should be recognized that only a few rays are shown for the purposes of illustration, and that in most embodiments a continuous distribution of optical radiation will exist incident at the window plane and within the integrated pump cavity.

FIGS. 1A and 1B show a bundle of components, or rays, of the optical pump radiation 120 injected at a midpoint within the pump cavity window 130. FIG. 1A shows longitudinal components, FIG. 1B shows transverse components. In FIG. 1A, a first ray 161 is injected at normal incidence, a second ray 162 is injected at an angle toward the first end 111, and a third ray 163 is injected at an angle away from the first end 111. The first ray 161 reflects from an angled section of the optical surface 150 directly centrally below the pump cavity window, and is injected into the pump cavity. The second ray 162, having a larger divergence, first reflects from the first end 111, and then reflects from the optical surface 150 into the pump cavity. The third ray 163, also having a larger divergence but in the opposite direction, is reflected from the optical surface 150.

In FIG. 1B, the transverse components of optical pump radiation injected at a midpoint in the pump cavity window 130 include a first ray 171 injected at a normal incidence, a second ray 172 injected at an angle toward the second lateral surface 104, and a third ray 173 injected at an angle toward the first lateral surface 103. The first ray 171 reflects from the lower boundary 102 parallel with the first and second lateral boundaries, and continues to propagate in a parallel manner through the gain medium. The second ray 172 reflects from the second lateral boundary 104 (by TIR, for example), then the lower boundary 102, then the first lateral boundary 103, then the upper boundary 101, and so forth until it is absorbed by the medium or reflected from the opposite (second) end 112. The third ray 173 mirrors the path of the second ray, first reflecting from the first lateral boundary 103, then reflecting from the lower boundary 102, and so forth.

FIGS. 1C and 1D show a bundle of components, or rays, of the optical pump radiation 120 injected through the pump cavity window 130 distal (far) from the first end 111. FIG. 1C shows longitudinal components, FIG. 1D shows transverse components. In FIG. 1C, a first ray 181 is injected at normal incidence, a second ray 182 is injected at an angle toward the first end 111, and a third ray 183 is injected at an angle away from the first end 111. The first ray 181 reflects from an angled section of the optical surface 150 directly centrally below the pump cavity window, and is injected into the integrated pump cavity. The second ray 182, having a larger divergence reflects from the more inclined area of the optical surface 150 and then is injected into the pump cavity. The third ray 183, also having a larger divergence but in the opposite direction, is reflected from an area of the optical surface 150 near the transition to reflective boundary 102. In practical terms, the angle of the third ray 183 is sufficient to inject it into the pump cavity.

In FIG. 1D, transverse components of optical pump radiation injected through the pump cavity window 130 proximate to the first lateral boundary 103 include a first ray 191 injected at a normal incidence, a second ray 192 injected at an angle toward the second lateral surface 104, and a third ray 193 injected at an angle toward the first lateral surface 103. The first ray 191 reflects from the lower boundary 102 parallel with the first and second lateral boundaries, and continues to propagate in a parallel manner through the gain medium. The second ray 192 reflects from the lower boundary 102, then the second lateral boundary 104, then the upper boundary 101, and so forth until it is absorbed by the medium or reflected from the opposite (second) end 112. The third ray 193 reflects from the first lateral boundary 103, then the lower boundary 102, then the second lateral boundary 104, and so forth.

The above FIGS. 1A–1D are illustrative only. The relationship between the integrated pump cavity, the optical pump radiation, and the medium extraction volume is designed to provide an appropriate pump intensity distribution throughout the laser medium, and many different designs can be made. In general, each subsequent reflection within the pump cavity has a reflection angle determined by the angle of incidence with the reflective surface. If the opposing surfaces are parallel, the reflection angle will remain substantially the same upon each subsequent reflection; however if the opposing surfaces are non-parallel, the reflection angle will change, which is described elsewhere in more detail, for example with reference to FIG. 2, which controls the distribution of pump energy throughout the integrated pump cavity.

Figure 2:
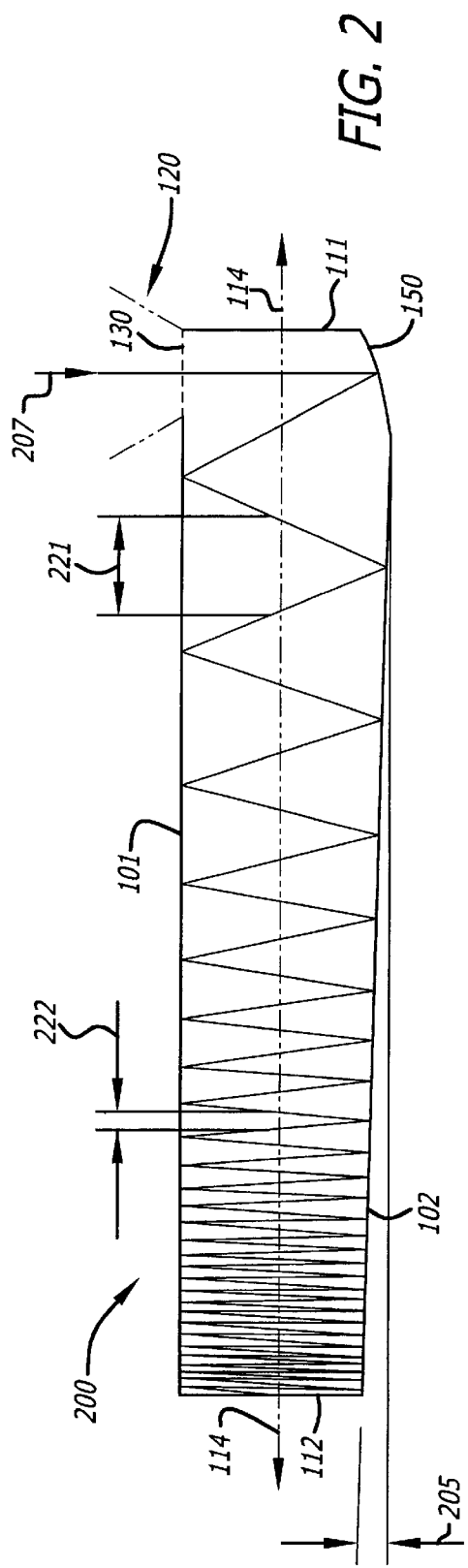
FIG. 2 is a longitudinal cross-section of a concentrating, integrated pump cavity according to one embodiment, illustrating one ray of optical pump radiation concentrating as it projects longitudinally along the laser axis.

FIG. 2 is a longitudinal cross section of an embodiment of a laser apparatus similar to FIG. 1, and also including a concentrating integrated pump cavity that includes two opposing non-parallel reflective surfaces defined by the upper medium boundary 101 the lower medium boundary 102. In FIG. 2, the upper boundary 101 is parallel with the laser axis 114, and the lower boundary 102 is not parallel, having a non-zero taper angle 205 with respect to the upper boundary 102. In other embodiments, the upper boundary may have a non-zero taper angle, either in addition to, or instead of the taper in the lower boundary.

The non-parallel reflective surfaces of the concentrating pump cavity have a suitable optical shape to produce the desired concentration pattern, for example the surfaces may be flat, approximately flat, or curved. In the illustrated embodiment, the upper and lower reflective surfaces are approximately flat, and the taper angle 205 causes the upper and lower surfaces to operate cooperatively to concentrate the intensity of the optical pump radiation as it travels along the laser axis 114, and thereby these surfaces approximately compensate for the energy transfer from the optical pump radiation through absorption by the gain medium. The taper angle is designed to meet the requirements of a particular laser design; for example, a large taper angle will more quickly concentrate the optical pump radiation and is more suited for short cavities and/or highly-doped gain media, while a small taper angle is more suited for longer cavities and/or lightly doped gain media. In some embodiments, a taper angle that varies along the laser axis either continuously or in steps may be useful. In one embodiment, a constant taper angle of about 1° has been found to be useful. In some embodiments, the taper angle 205 is large enough that some or all of the pump radiation reverses its direction before reaching the second end 112.

To illustrate how the optical pump radiation is concentrated, an optical pump ray 207 is shown entering the pump cavity at normal incidence through the pump cavity window 130. It should be recognized that the ray 207 is only one of many rays in the optical pump radiation. After the ray 207 is injected into the solid state gain medium, the shape and relationship of the non-parallel surfaces of the integrated pump cavity at each reflection from the non-parallel lower boundary progressively reduces the angle of incidence of the optical pump radiation, increasing spatial overlap between adjacent pump reflections as the optical pump radiation projects longitudinally along the laser axis from the first end 111 toward the second end 112, thereby progressively concentrating unabsorbed optical energy. More particularly, as the pump ray 207 repeatedly reflects between the upper and lower non-parallel surfaces 101 and 102, it has a decreasing longitudinal component along the laser axis 114. Initially, the angle of reflection from the first and second reflectors is relatively large and therefore the traversal points of the optical pump radiation are relatively widely separated as illustrated at 221, but because the reflective surfaces are non-parallel, the angle of reflection becomes progressively narrower as the optical pump radiation projects longitudinally along the laser axis and therefore the traversal points across the laser axis become progressively closer and closer, as illustrated at 222. The increasing spatial closeness of adjacent reflections increasingly concentrates pump energy by increasing the overlap between adjacent reflections.

However, at the same time optical pump energy is being absorbed during each traversal of the solid state gain medium. The increasingly concentrated intensity at least partially compensates for pump energy absorbed or otherwise lost during previous traversals across the gain medium. In some embodiments, the concentrating pump cavity can be designed with a shape and taper angle that approximately compensates for the optical pump energy previously absorbed or lost, so that the absorbed optical pump energy is approximately uniformly distributed within the gain medium. In summary, the concentrating non-parallel reflective surfaces of the pump cavity shown in FIG. 2 can be designed to more uniformly distribute absorbed pump energy within the extraction volume.

Figure 3:
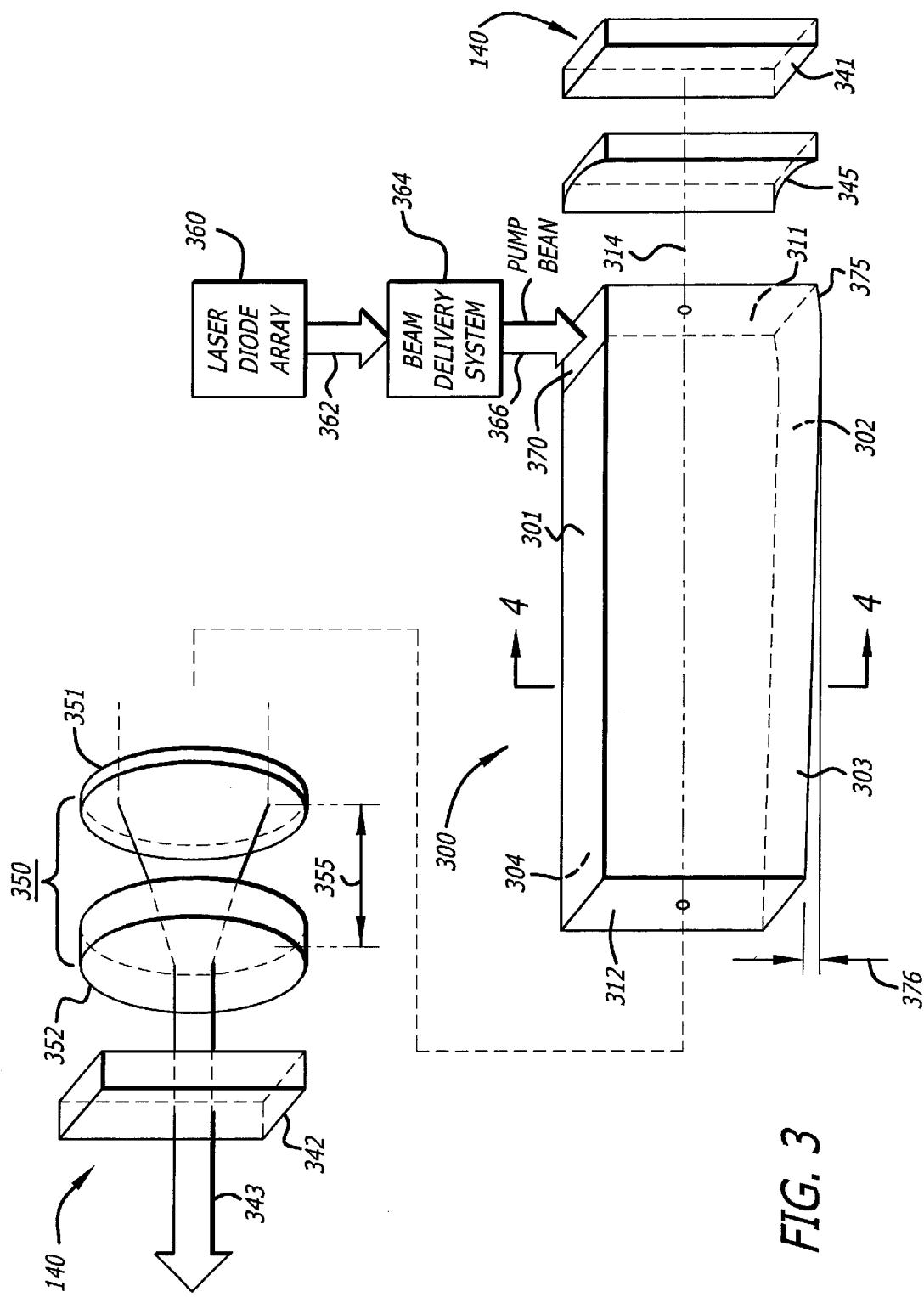
FIG. 3 is a perspective view of one embodiment of the invention, including a solid state laser gain medium in a rectilinear slab geometric configuration.

Reference is now made to FIG. 3, which is a perspective view of one embodiment of laser system in which the gain medium 100 comprises a solid state material having a rectilinear shape configured to provide an integrated pump cavity. The gain medium defines an integrated pump cavity that comprises an upper reflectively-coated surface 301, a lower reflectively-coated surface 302, a first lateral coated surface 303, a second lateral coated surface 304, a polished and coated first end 311, and a polished and coated second end 312. A laser axis 314 is defined through the first and second ends. In FIG. 3, the optical extraction system 140 provides a linear laser resonator, and the optical pump source 122 includes a laser diode array. The laser system described with reference to FIG. 3 is particularly suited for high power operation (e.g. 1 kilowatt or more); of course this laser system is also useful at lower power levels. One advantage of the solid state embodiment is that a cooling system can be situated proximate to the gain medium where heat is generated without interference with the pump radiation, such as described with reference to FIGS. 9 and 10, which facilitates effective cooling, an advantage that is especially important at high power. Still another advantage is that the gain medium can be mounted straightforwardly onto a base (not shown) of any laser system.

The optical extraction system 140 in the embodiment of FIG. 3 includes a pair of end mirrors including a first end mirror 341 and a second end mirror 342 situated on opposing sides of the gain medium 100. In this embodiment, the end mirrors define a linear optical laser resonator through the gain medium, with the second end mirror being slightly less reflective (e.g. 90–95%) to provide the output coupling from the laser resonator for a laser output 343; of course, alternative embodiments may use other cavity configurations. The end mirrors may be flat, alternatively they may be curved to enhance stability, or they may have any other appropriate shape.

The optical system 140 may also include a thermal distortion correction system including a cylindrical lens 345 situated, for example between the first end mirror 341 and the gain medium 300 to approximately compensate for thermally-induced optical lensing within the gain medium. Other embodiments may utilize alternative optical configurations as appropriate to compensate for the thermally-induced distortion generated in the particular system. For example the cylindrical lens, or a higher order lens may be actively controlled in some embodiments to allow compensation for varying power levels.

The optical system 140 may also include a mode control system 350 situated, for example, between the gain medium and the second end mirror, including a converging lens 351 and a diverging lens 352 spaced apart by a separation 355 to appropriately demagnify the beam within the laser resonator, and to control the output laser beam 343. Also, the mode control system 350 can be utilized to control the lasing mode within the laser resonator. In some embodiments (not shown), an active system could be provided to, for example, adjust the separation 355 between the converging and diverging lens, in order to optimize the output beam and/or the resonator modes for a particular configuration and power level.

The pump source 122 includes, for example laser diode array 360 that emits high radiance optical radiation 362 at a wavelength that can be absorbed and converted to upper laser level storage by the gain medium 300. For example, an embodiment of the laser diode array suitable for Yb:YAG gain media emits at a wavelength of about 940 nm. The laser diode array 360 includes any number of laser diodes in any configuration sufficient to provide the necessary optical pumping energy: a large number of laser diodes may be needed for high power applications.

A beam delivery system 364 receives the optical radiation from the laser diode array and optically processes it into a beam 326 having a shape and orientation suitable for injection into the gain medium through a pump cavity window 370. Accordingly, the beam delivery system 364 includes any components suitable for its intended purposes such as focusing optics, cylindrical lenses, optical fibers, or lens ducts. The pump cavity window 370 is formed proximate to the first end, and is sized to accept substantially all of the optical pump radiation delivered to the pump cavity window by the beam delivery system 364. In one embodiment, the beam delivery system includes a mirror system to redirect the beam from a remote laser diode pump source, and an aspheric focusing optics or a lens duct to approximately focus the beam 326 onto the pump cavity window 370. Other embodiments may include an array of optical fibers to deliver the beam from the remote laser diode array(s) to the pump cavity window. Advantageously, the beam delivery system injects substantially all the optical pump radiation from the laser diode pump source through the pump cavity window and into the gain medium, providing a high intensity at the input window, which is projected throughout the gain medium by the integrated pump cavity.

A curved recollimating surface 375, similar to the optical surface 150 (FIG. 1) is formed in the gain medium opposite the pump cavity window 370, with a shape that has an off-axis recollimating cylindrical radius, in order to recollimate the input optical pump radiation into approximately collimated beams which are then projected over a range of angles into the integrated pump cavity. So projected, the optical pump radiation alternately reflects between the first and second reflective surfaces, sometimes reflecting from the third and fourth sides at angles of incidence larger than the critical angle for TIR, while gradually projecting along the laser axis down the length of the gain medium. Complete optical pump radiation confinement is further accomplished by reflecting optical pump radiation from the first and second ends 311 and 312. Due to the large angle of incidence at the sides 303 and 304 and the first and second ends 311 and 312, it is expected that the optical coatings on these ends will not be required to reflect the optical pump radiation; however, alternative embodiments may include such reflective coatings.

The various surfaces of the solid state gain medium are formed by any suitable technique such as optical figuring or precision machining. In one embodiment, the upper and lower reflective surfaces are formed into flat, opposing, non-parallel (with respect to each other along the laser axis) surfaces by grinding and polishing techniques. In the dimension along the laser axis, the flat surfaces are arranged in a tapered configuration, with a larger separation proximate to the first end and a progressively smaller separation toward the second end. In the dimension perpendicular to the laser axis, the first and second reflective surfaces are equidistant. In FIG. 3, the upper reflective surface 301 is approximately parallel with the laser axis 314, while the lower reflective surface 302 is tapered with respect to the laser axis, and therefore the reflective surfaces are non-parallel with respect to each other. Specifically, the lower reflective surface 302 is tapered at a small angle 376 with the central axis 314, such that the included angle is greater than 0° (about 1° in one embodiment). As discussed with reference to FIG. 2, the non-parallelism between the upper and lower surfaces serves to gradually reduce the angle of incidence of the optical pump radiation as it projects down the gain medium from the first end toward the second end. Accompanying this angular reduction is a corresponding increase in beam overlap which acts to increasingly concentrate the optical pump radiation. If desired, the taper angle can be selected and/or the upper and lower surfaces can be shaped to produce an intensity concentration of pump radiation that substantially compensates for the intensity reduction due to pump absorption by the laser medium, thereby producing a substantially uniform average spatial pump intensity distribution throughout a large portion of the gain medium.

One advantage of the solid state embodiment is that various suitable optical coatings can be formed directly on the different surfaces of the solid state gain medium 300. Conventional optical coating techniques are used to provide the necessary coatings on the first and second ends 311 and 312. The coatings on the upper and lower surfaces and the first and second lateral surfaces are designed to suppress ASE while still providing an effective pump cavity, such as described in detail with reference to FIGS. 4 and 5. Generally, the upper and lower reflective surfaces 301 and 302 are coated with an optical coating that provides very high reflectivity at the pump wavelengths for an appropriately wide range of internal angles of incidence about normal. The pump cavity window 370 is coated for anti-reflection and anti-absorption at the pump wavelengths.

In one embodiment the solid state material 100 comprises Yb:YAG (ytterbium-doped YAG) that has a relatively low doping concentration compared to other Yb:YAG lasers; for example, doping concentrations in the range of <0.1% to about 1.0%, are useful for high power laser designs, and particularly 0.2% has been used. The concentration is conventionally defined by the percentage of locations in the crystal structure where Y (yttrium) is replaced by Yb. Of course, alternative embodiments can utilize other gain media and/or other percentages. The relatively low doping concentration of Yb:YAG in this embodiment, together with the integrated pump cavity, allows the pump energy to be distributed throughout the pump cavity, and provides a pump photon lifetime $T_c$ substantially longer than the prior art pumping concepts, which is useful to achieve high power operation in three-level and quasi three-level laser media such as Yb:YAG. Furthermore, because much of the waste heat in a solid state gain medium is created following the same distribution as the absorbed pump radiation, the relatively low doping concentration allows absorption to be distributed throughout the pump cavity, which promotes a uniform heat distribution throughout the gain medium. Such thermal considerations are particularly important at high power, and are discussed in detail with reference to FIGS. 9 and 10.

Suppression of ASE and Parasitic Mode Oscillation

For viable laser operation, the integrated pump cavity described herein includes features to suppress gain medium parasitic mode oscillation and amplified spontaneous emission ("ASE"), so that significant amplification of laser emission is allowed only along the optical paths that lie along (i.e. parallel with) the laser axis within the extraction volume and are controlled by the optical system. If any other optical path through the gain medium were to permit significant ASE or parasitic mode oscillation, substantial energy would be drawn from the extraction volume, detrimentally reducing lasing efficiency. For example, significant ASE losses can occur if multiple reflections of the laser emission from the reflective surfaces of the integrated pump cavity provide a lengthy optical path through the gain medium. Even worse, if the optical path of ASE is resonant (i.e. closed), parasitic oscillation can occur. Unfortunately, if the pump cavity that surrounds the gain medium were made with standard reflective coatings, laser emission would be reflected around the pump cavity together with pump radiation, giving rise to significant ASE problems. In order to insure effective and efficient laser operation, the integrated pump cavity described herein includes special coatings that work individually and cooperatively with the cavity design to dampen ASE and suppress parasitic mode oscillation while still being reflective to the optical pump radiation. Such a design is particularly useful for laser systems that utilize laser media having high indexes of refraction such as the embodiment that uses Yb:YAG as its gain medium.

One novel coating described herein provides control of the effective critical angle of total internal reflection ("TIR"), which is selected to suppress ASE. TIR is a known optical property by which a beam propagating through a material having a high index of refraction is reflected at an interface with another medium that has a lower index of refraction, if the angle of incidence is larger than a critical angle. The critical angle at which TIR begins to be observed is a function of the difference between the indices of refraction of the two materials, and therefore certain high index materials such as Yb:YAG are particularly susceptible to TIR-related ASE amplification due to the larger range of angles that are totally reflected. In certain integrated pump cavity designs without ASE suppression means, reflections due to TIR from the side boundaries could reflect unwanted spontaneous emission from side to side within the pump cavity, amplify the spontaneous emission, drain energy, and provide closed paths to allow parasitic mode power extraction. Conventional multilayer coatings do not increase the critical angle of TIR.

One ASE suppression system, described with reference to FIGS. 4 and 5, includes specific coatings on all transverse reflective surfaces, which introduce sufficient losses at the lasing wavelength so that no significant low loss internal optical paths exist that would otherwise significantly support ASE or parasitic oscillation at any wavelength for which the medium has optical gain.

Figure 4A:
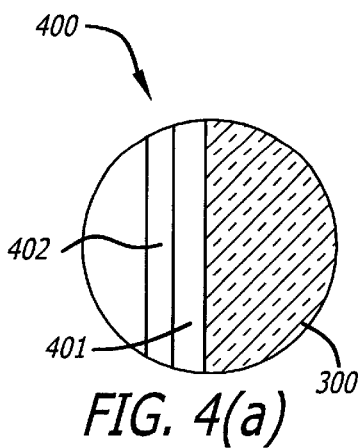
FIG. 4(a) is a magnified view of a portion of the gain medium depicted in FIG. 4 taken along the left edge thereof.
Figure 4B:
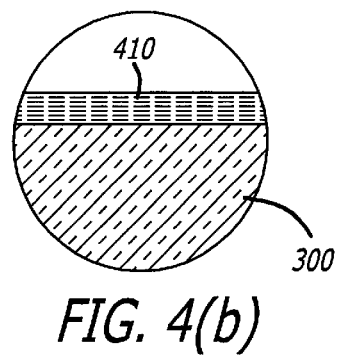
FIG. 4(b) is a magnified view of a poriton of the gain medium depicted in FIG. 4 taken along the top edge thereof.
Figure 4:
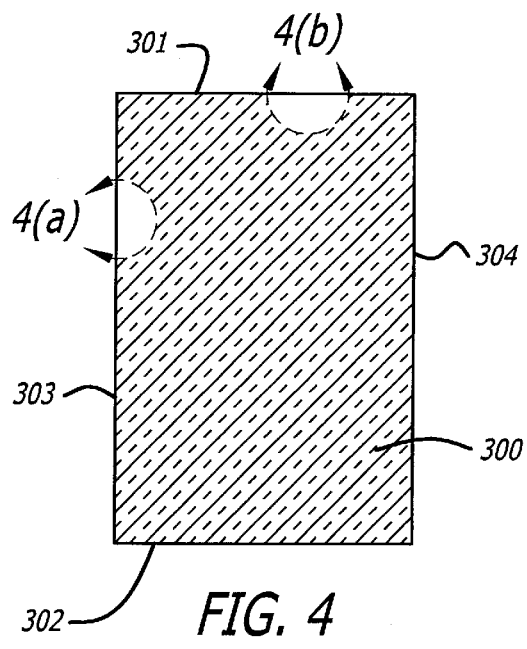
FIG. 4 is a transverse cross-sectional diagram of a solid state gain medium that includes one embodiment of coated surfaces to suppress amplified spontaneous emission ("ASE")

Reference is now made to FIG. 4 to illustrate one way in which the optical coatings on the transverse surfaces of the solid state gain medium 300 are designed to reflect the optical pump radiation and still suppress ASE and resultant parasitic oscillation. These transverse surfaces include the upper and lower surfaces 301 and 302, and the first and second lateral surfaces 303 and 304. Referring briefly to FIGS. 1A–1D, it may be noticed that optical pump radiation interacts with the lateral surfaces 103 and 104 only at angles of incidence greater than a critical minimum angle determined by the design of the integrated pump cavity and the beam characteristics of the optical pump radiation injected into the pump cavity. For example, in one design, the known maximum pump half angle divergence inside the gain medium in the transverse dimension is about 30°, and therefore the angle of incidence of the optical pump radiation with the lateral surfaces will generally be greater than 60°. Beginning with the first lateral surface 303, an optical coating 400 includes a first layer 401 deposited on the gain medium 300, the first layer 401 comprising an appropriately thick layer of low loss material that has an index of refraction lower than that of the laser medium and small enough to support TIR reflection of optical radiation at angles greater than the minimum pump angle, but large enough to accept transmission of optical radiation at lesser angles. Thus, the optical pump radiation, which has an angle of incidence sufficient to be reflected due to TIR, will be reflected at the medium interface with the first layer 401, while much of the ASE, which has an angle of incidence less than the minimum pump angle, is mostly transmitted through the interface and into the first layer 401.

A second appropriately thick layer 402 is deposited on top of the first layer 401. The second layer 402 comprises a material having an index of refraction at least as high as that of the first layer in order to eliminate TIR at the interface between the first and second layers. Therefore, except for Fresnel reflection, substantially all the ASE transmitted into the first layer propagates to the second layer 402. The second layer 402 has a high absorption coefficient at the laser wavelength and a sufficient thickness to substantially absorb all ASE that enters the layer. Opposite the first lateral surface 303, the second lateral surface 304 has a similar two-layer coating.

In summary, on both lateral surfaces of the gain medium, the novel two-layer coating 400 effectively increases the critical angle for TIR to a value large enough that spontaneous emission generated within the solid state gain medium will only be reflected from the side boundaries at a large angle along the laser axis. In one embodiment the gain medium comprises Yb:YAG, which has an index of refraction of about 1.82. The critical angle of incidence for TIR is made greater than about 57° by using a material for the first coating layer that has an index greater than about 1.53. ASE reflected from the lateral boundaries at an angle greater than 57° and propagating in the longitudinal direction will encounter an angle of incidence with the first or second ends less than 33° and will therefore be mostly transmitted out of the gain medium. One embodiment of such a coating design for Yb:YAG utilizes aluminum oxide ($Al_2O_3$) as the first layer material, which effectively sets the critical angle for TIR greater than about 57°, and in one embodiment, approximately 63°, an increase of about 30° from the typical 33° expected of uncoated or conventionally-coated boundaries. For good performance in one embodiment, the first coating layer has a thickness of at least a few wavelengths thick. Of course, in alternative designs other materials and/or other coating designs could be implemented. For the second layer 402, one embodiment comprises germanium (Ge), which is highly absorptive at the lasing wavelengths near one micron. In alternative designs other materials and/or other coating designs could be implemented.

It will be recognized that other ASE having an angle of incidence greater than the above-defined effective critical angle for TIR will be reflected from the lateral boundaries, and such ASE may reflect from the upper and lower reflective surfaces 301 and 302. Also, ASE generated elsewhere within the gain medium may be reflected from the upper and lower surfaces. In order to suppress ASE at the upper and lower surfaces, spontaneous emission is either absorbed in, or transmitted through, the pump cavity surfaces. However, the optical pump radiation must be highly reflected over a range of angles of incidence about normal incidence, and therefore, unlike the coatings on the lateral surfaces, the coatings on the upper and lower surfaces do not use TIR to selectively reflect optical pump radiation.

Generally, the coating deposited on the upper and lower surfaces is designed to reduce reflection of ASE, while still having high reflectivity of the optical pump radiation. Specifically, a wavelength-sensitive reflective coating 410 is deposited on the upper and lower surfaces 301 and 302. The wavelength-sensitive coating 410 is designed to substantially suppress ASE on the upper and lower reflective surfaces, so that each reflection of ASE incurs a loss significantly greater than the spontaneous emission and amplification produced within the solid angle along the path between successive reflections. In other words, the coating 410 is designed so that, over all angles of incidence not absorbed by the lateral surface coating, the loss at the ASE (laser) wavelength is greater than the operational gain of the gain medium along the path between the upper and lower surfaces. For example, if the maximum gain between successive reflections is 10%, then each reflection of ASE from the upper and lower reflective surfaces incurs at least a 10% loss, and preferably as large as possible. Accordingly, the design specifications for the optical coatings for these pump cavity surfaces should consider the specific operating conditions of the laser system and must be selected for each configuration.

Conventional multi-layer coating techniques can be used to design such a coating. Alternatively, one or more layers of selectively (non-pump absorbing) ASE-absorbing material can be included in the coating design. In one embodiment, the multilayer coatings on the upper and lower surfaces are composed of materials substantially all of which have an index of refraction greater than or approximately equal to that of the first layer 401 and an outer layer of a very high loss, high index material such as germanium, in order to provide very high normal incidence range reflectivity at the pump wavelengths and a reduced reflectivity at the wavelengths for which the laser medium exhibits gain even at large angles of incidence.

Figure 5A:
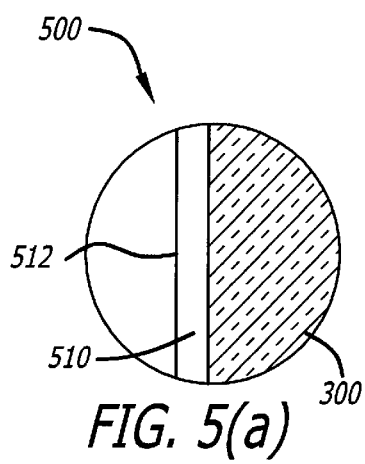
FIG. 5(a) is a magnified view of a portion of the gain medium depicted in FIG. 5 taken along the left edge thereof.
Figure 5B:
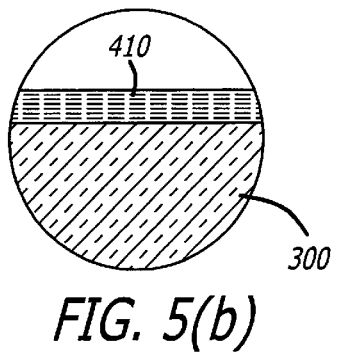
FIG. 5(b) is a magnified view of a portion of the gain medium depicted in FIG. 5 taken along the top edge thereof.
Figure 5:
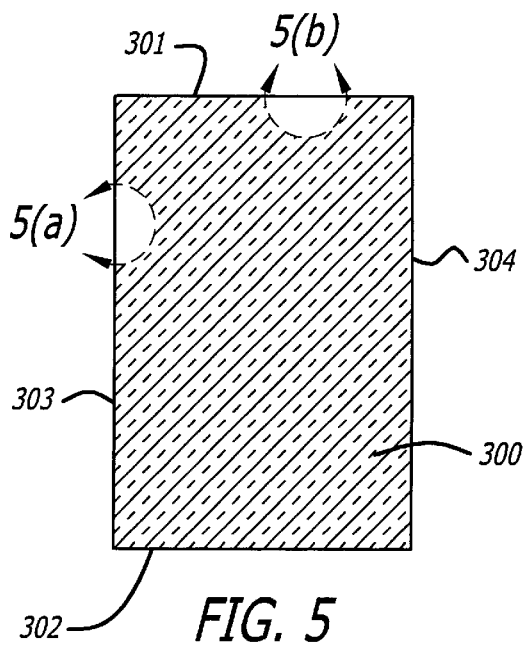
FIG. 5 is a transverse cross-sectional diagram of a solid state gain medium that includes another embodiment of coated surfaces to suppress ASE.

FIG. 5 is a cross-section of an alternative structure for suppressing parasitic oscillation, including an optical coating shown generally at 500, including a layer 510 deposited on first lateral surface 303 of the gain medium 300. Like the first layer 401 in the embodiment of FIG. 4, the layer 510 comprises a low loss material having an index of refraction lower than that of the gain medium and small enough to reflect optical radiation at angles greater than the minimum pump angle, but large enough to transmit optical radiation at lesser angles. Thus, the optical pump radiation, which has an angle of incidence sufficient to be reflected due to TIR, will be reflected at the interface with the layer 510, while much of the ASE, which has an angle of incidence less than the minimum pump angle, is transmitted through the interface and into the layer 510. However, the layer 510 will typically be thicker than the first layer 401. On the outer surface of the layer 510, a ruling or some suitable abrasive disfiguration 512 (which may be provided by sandblasting) is provided to at least partially transmit ASE that propagates through the layer 510. On the opposite, second lateral surface 304, a similar optical coating 500 is formed thereon that is reflective to the optical pump radiation due to TIR, and then a ruling or some suitable abrasive disfiguration of the outer surface is made to allow at least partial transmission of spontaneous emission.

Figure 6:
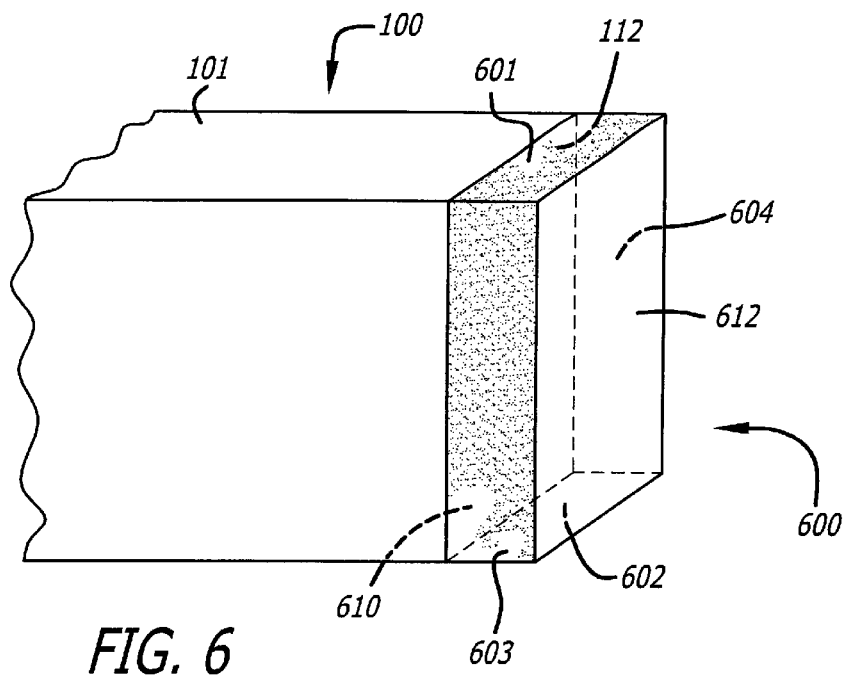
FIG. 6 is an embodiment of a solid state laser assembly that includes an end block to suppress ASE.

FIG. 6 is an alternative embodiment of a solid state laser assembly having an integrated pump cavity, including features for suppressing ASE within the pump cavity. In this embodiment, the gain medium 100 comprises a solid state gain medium, and the second end 112 does not comprise an end mirror for reflecting laser emission. The second end 112 of the gain medium is bonded by any suitable technique, such as diffusion bonding, to a rectangular end block 600 that comprises an optical medium with suitable optical characteristics for transmitting the laser emission. In one embodiment, the optical medium in the end block comprises an undoped version of the solid state gain medium; for example, if the gain medium comprises Yb:YAG, then the optical medium may comprise undoped YAG. The transverse surfaces of the end block 600 include an upper surface 601 and a lower, opposing surface 602, and a first lateral surface 603 and a second, opposing lateral surfaces 604, which are roughened by any suitable technique such as sandblasting or made absorptive by suitable optical coatings. The end block 600 includes a first end 610 having a suitable shape for bonding with the second end 112. The second end 612, opposite the first end 610, is optically coated with a suitable coating. For example, a reflective coating may deposited on the second end 612 to define an end mirror of a laser resonator. In other embodiments, an anti-reflection coating may be deposited on the second end.

ASE suppression in the embodiment of FIG. 6 is provided by the roughened transverse surfaces 601, 602, 603, and 604. Particularly, the roughened surfaces allow optical radiation to exit the end block 600, and therefore any ASE incident upon these surfaces will be partially transmitted away or absorbed. It may be recognized that any pump radiation incident upon these roughened surfaces will also be transmitted or lost, and therefore the pump cavity must be designed accordingly. One way to prevent significant loss of pump radiation is to design the cavity in a concentrating configuration (such as shown in FIG. 2) with an angle and length sufficient to turn around the pump radiation before it enters the end block 600. The ASE suppression system disclosed with reference to FIG. 6 may be used in combination with other ASE suppression methods, such as those described with reference to FIGS. 4 and 5.

Figure 7:
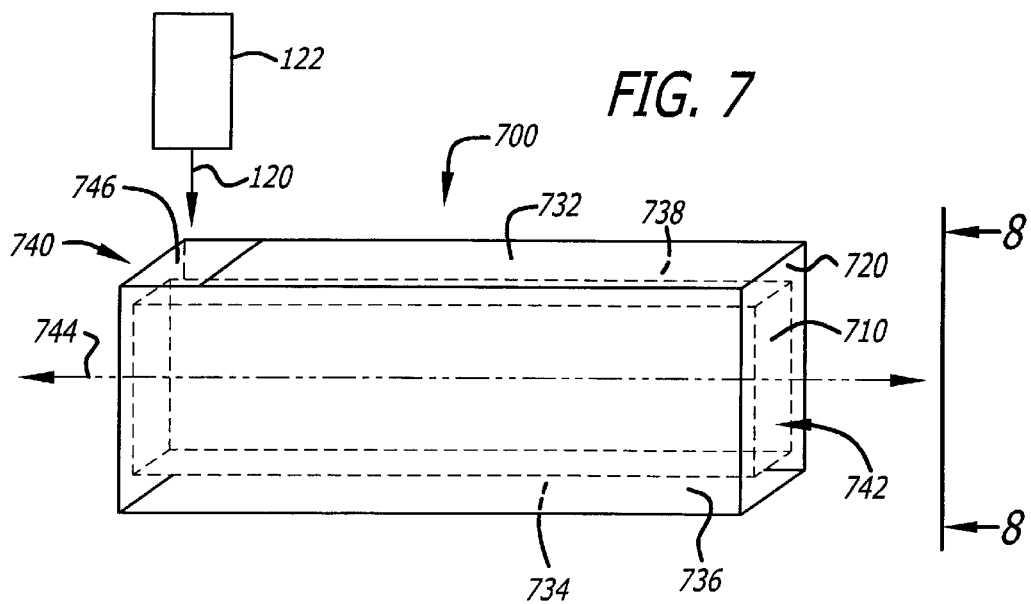
FIG. 7 is a perspective view of a laser that includes a slab of solid state gain medium having an inner region doped with a first concentration of a pump absorptive ion and an outer region surrounding the inner region that has a different doping concentration.
Figure 8:
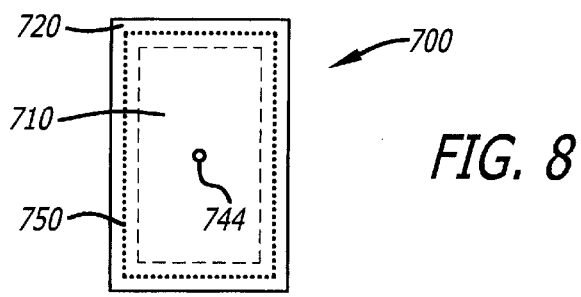
FIG. 8 is a cross section of the solid state gain medium shown in FIG. 7.

Reference is now made to FIGS. 7 and 8 to illustrate an alternative embodiment of a solid state laser with an integrated pump cavity. FIG. 7 shows a solid state laser including a slab of solid state gain medium 700 having an inner region 710 and an outer region 720 surrounding the inner region. FIG. 8 is an end view of the solid state gain medium 700 shown in FIG. 7. The inner region 710 is doped with an active pump absorptive ion at a predetermined level, and the outer region 720 has a different doping concentration of the pump ion, which in one embodiment is undoped. Typically, it is advantageous that the outer region has a lesser concentration. In many solid state gain media, the pump ion is the same as the lasant ion, while in other laser media, the pump ion is different from the lasant ion. If the pump ion is different from the lasant ion, the gain media is termed "co-doped".

The solid state gain medium has an integrated pump cavity that confines the optical pump radiation, as described elsewhere herein, for example with reference to FIG. 1, 2, 3, or 4, and suppresses ASE and parasitic modes utilizing appropriate optical coatings formed on the exterior surface of the outer region, including an upper reflective surface 732, a lower reflective surface 734, a first lateral surface 736, and a second lateral surface 738. A first end mirror 740 and a second end mirror 742 define a linear laser resonator within the solid state gain medium, with a central optical axis 744 defined thereby. The pump source 122, described for example with reference to FIG. 1, provides optical radiation 120 through a pump cavity window 746 on a boundary of the solid state gain medium.

In embodiments in which the integrated pump cavity produces an average pump radiation that is approximately uniform and is not significantly dependent upon local variations in the dopant concentration distributions, one advantage of the embodiment of FIGS. 7 and 8 is that the distribution of stored energy available for laser emission is nearly the same as the pump absorptive ion dopant distribution. Because the stored energy is concentrated in the inner, more highly doped region and significantly reduced in the outer, lesser doped region, the laser emission is concentrated in the inner region, while the laser mode is allowed to extend into the outer, lesser doped region, which reduces boundary dependent losses, thereby increasing efficiency. Particularly, the inner doped region 710 supports a lasing radiation distribution having an outline shown in FIG. 8 at 750 extending into the lesser doped outer region 720, thereby avoiding losses that would otherwise occur if the stored energy and lasing radiation distribution extended to the exterior boundary of the laser medium.

Although FIGS. 7 and 8 show an embodiment in which the cross-section of both the inner and outer regions is approximately rectangular, other embodiments may comprise any other suitable cross-section, such as circular or square. The inner and outer regions of the solid state gain medium may be formed as a composite structure by bonding suitably doped materials, or alternatively the dopant concentration distributions of the inner and outer regions of the solid state gain medium may be formed during the material fabrication process. In some embodiments, the inner and outer regions may not have a clear boundary; instead the doping concentration may be variable, or graded in some manner, between the inner and outer regions. For example, the doping concentration may be graded throughout the gain medium, so that the concentration in the center is largest, and decreases progressively away from the center. In one embodiment both the inner and outer regions of the solid state gain medium comprise a YAG crystal, the inner region is doped with ytterbium, and the outer region is substantially undoped. It should be apparent that other embodiments may utilize different solid state gain mediums, different dopants or a combination of dopants. Also other embodiments may utilize a graded dopant concentrations, and/or various dopant concentration distributions.

Cooling a Solid State Gain Medium

Figure 9:
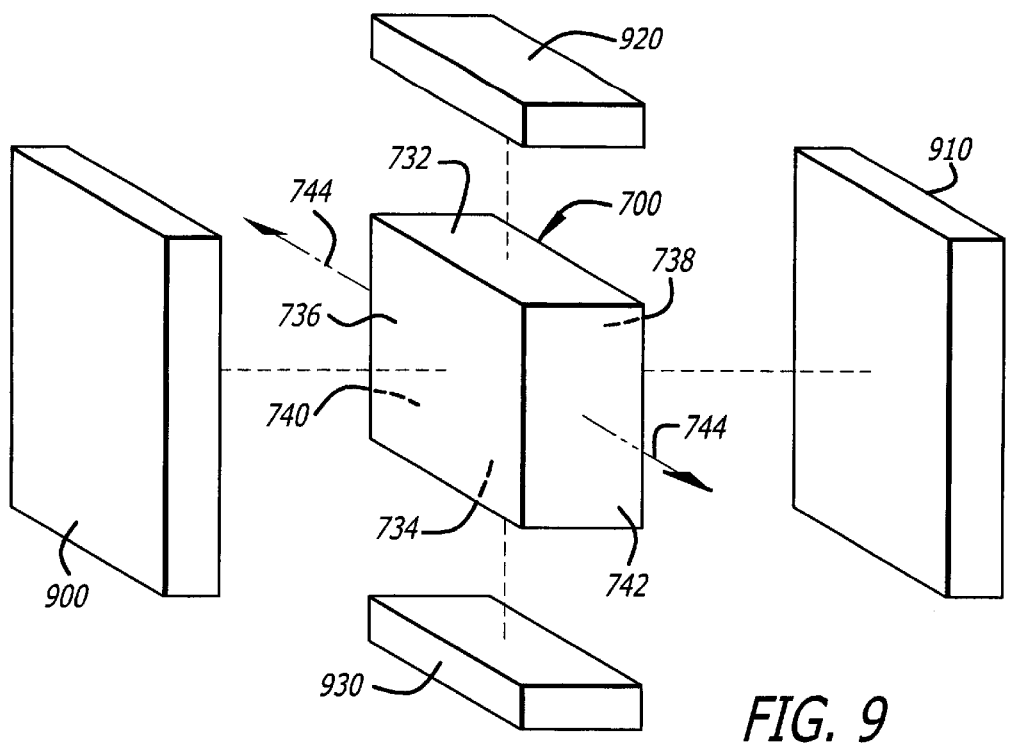
FIG. 9 is an exploded view of a solid state laser including a heat sink.
Figure 10:
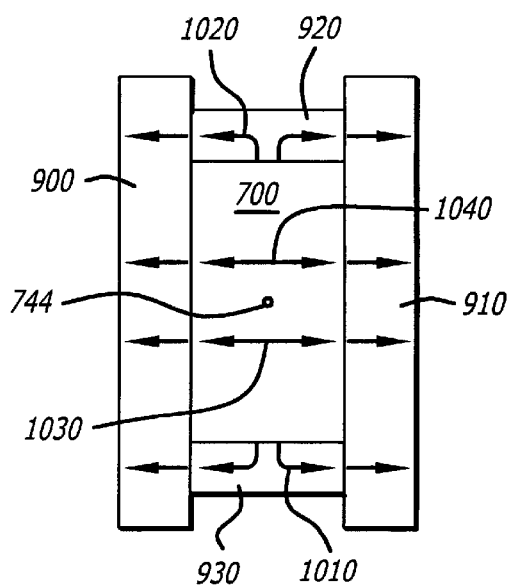
FIG. 10 is an assembled cross-section of the solid state laser and heat sink shown in FIG. 9.

Reference is now made to FIGS. 9 and 10 to illustrate a system that directly cools the reflective boundaries of the solid state gain medium. One advantage of the solid state embodiment is that a cooling system can be situated proximate to the gain medium where heat is generated. Direct cooling of the boundaries of the solid state gain medium provides significant cooling capabilities, which is important for high power operation. Prior art side-pumped solid state lasers typically have their pump reflective surfaces situated separate and apart from the gain medium. In order to directly cool the boundaries of the solid state gain medium with these prior art devices, the heat sink is situated between the pump reflective surfaces and the gain medium, which requires the heat sink to be transparent to the pump radiation. Such transparent heat sinks can be difficult to design and expensive to implement. In addition, no heat sink is completely transparent, and therefore losses of optical pump radiation are incurred at each pass through the transparent heat sink.

In contrast, the integrated pump cavity described herein has reflective surfaces formed directly on the solid state gain medium, and therefore solid, liquid, or gaseous heat sinks can be coupled directly to the sides of the solid state gain medium. Heat can flow directly from optical coatings and the gain medium, through the optical coatings into the heat sinks. Advantageously, the pump light is contained within the boundaries of the gain medium without interacting with the heat sinks, thereby avoiding losses while at the same time providing effective heat transfer.

FIG. 9 is an exploded view of a cooled, high power solid state laser embodiment. In FIG. 9, the solid state gain medium 700 shown in FIG. 7 is used as an example of a solid state gain medium; of course, in alternative embodiments other solid state embodiments could be utilized. A first heat sink 900 is coupled to the first lateral surface 736, a second heat sink 910 is coupled to the second lateral surface 738, a third heat sink 920 is coupled to the upper reflective surface 732, and a fourth heat sink 930 is coupled to the lower reflective surface 734. The third and fourth heat sinks are also thermally coupled to the first and second heat sinks. The first and second heat sinks 900 and 910 preferably comprise a highly heat capacitive material, such as water or thermo-electrically cooled copper, coupled to the respective first and second transverse surfaces 736 and 738 using a thermally conductive material such as indium foil or a conductive film. The third and fourth heat sinks 920 and 930 comprise any suitable form, such as copper coupled to respective upper and lower surfaces 732 and 734 and also coupled to first and second heat sinks 900 and 910 using a thermally conductive material such as indium foil or a conductive film. In some embodiments, the first, second, third, and fourth heat sinks comprise an active or passive heat flow regulation mechanism designed to approximately provide a desired temperature distribution within the gain medium. In one embodiment, the heat sinks are designed so that the first and second heat sinks maintain an approximately constant temperature along their interfaces with the gain medium, and the third and fourth heat sinks maintain a predetermined temperature distribution, such as approximately parabolic. In such embodiment, the thermal distortion of the laser emission within the solid state laser medium can be corrected with a cylindrical lens such as shown in FIG. 3. In some embodiments, it may be desirable to limit or minimize the temperature variation between the upper and lower medium boundaries, and in such embodiments the third and fourth heat sinks may comprise an actively heated or cooled thin metallic plate.

FIG. 10 is an assembled cross-section of the solid state laser assembly shown in FIG. 9, in an embodiment where the first and second heat sinks 900 and 910 have substantial heat exchange capabilities, such as in embodiments where the heat sinks include active cooling. The third and fourth heat sinks 920 and 930 are situated to draw heat away from the upper and lower surface coatings as illustrated by the arrows 1010 and 1020, and conduct it to the first and second active heat sinks 900 and 910 where it can be disposed of. Also, the first and second active heat sinks 900 and 910 are situated to draw heat directly away from the first and second lateral surfaces of the gain medium as illustrated by the arrows 1030 and 1040. In one embodiment, the temperature distribution along the first and second heat sinks 900 and 910 is designed to match the temperature distribution along the adjacent sections of the gain medium, which advantageously reduces high order thermal distortion. Furthermore, FIG. 10 shows that the first, second, third and fourth heat sinks are all situated immediately adjacent to the boundary of the solid state gain medium, which provides effective heat transfer.

Additional Alternative Embodiments

The integrated pump cavity described herein can be implemented in many different embodiments. For example, instead of the approximately rectangular slab shown in FIG. 3, alternative shapes can be utilized. Some alternative embodiments are shown in FIGS. 11–15, and many others are possible. Each alternative embodiment illustrated in FIGS. 11–15 includes a solid state gain medium having boundaries configured to provide an integrated pump cavity within the solid state gain medium. Any appropriate optical extraction system is utilized to control the laser energy within the gain medium, such as the system 140 shown in FIGS. 1 and 3. Furthermore, thermal distortion correction systems and mode control systems may be utilized, such as those discussed with reference to FIG. 3.

Figure 11:
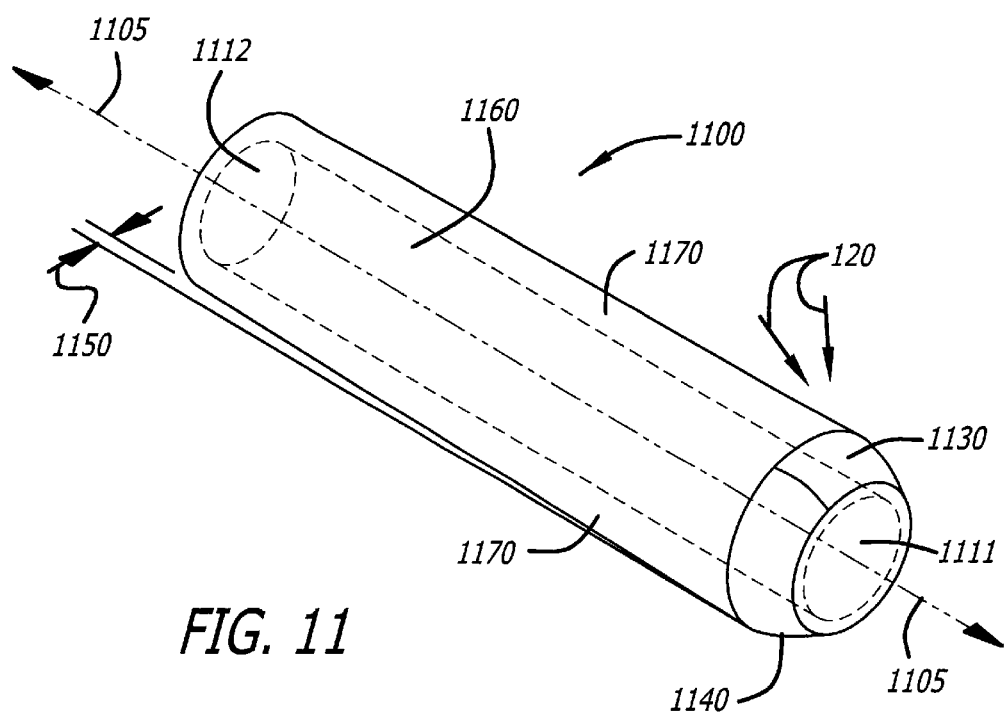
FIG. 11 is a perspective view of an alternative embodiment in which the solid state gain medium is formed into an approximately tapered cylinder.

Reference is now made to FIG. 11, which is a perspective view of an alternative embodiment in which a solid state gain medium, shown generally at 1100 has an approximately cylindrical shape that defines a cylindrical axis 1105, a first end 1111, and a second end 1112, with an approximately circular cross-section. Alternative embodiments may comprise other cross-sectional shapes, such as elliptical. In typical embodiments, laser emission is constrained by an optical extraction system such as shown in FIG. 3 to propagate between the first and second ends, approximately following the cylindrical axis 1105. The transverse cylindrical boundaries of the gain medium are coated appropriately to define an integrated pump cavity. For example, coatings may be utilized as described with reference to FIG. 4 or 5 in order to suppress ASE, by coating upper and lower surfaces of the cylinder with a pump reflective coating, and by coating first and second transverse surfaces with an angle dependent reflective coating. Furthermore, selected surfaces of the gain medium may be roughened to suppress ASE as shown in FIG. 6 either alone or in combination with the ASE-suppressive coatings of FIG. 4 or 5.

Any appropriate source of optical pump radiation 120 may be utilized, such as the laser diode array 360 and beam delivery system 364 shown in FIG. 3. A pump cavity window 1130 is formed proximate to the first end 1111 in order to receive the optical pump radiation 120 and input it into the gain medium. Opposite the pump cavity window 1130, an off-axis recollimating cylindrical shape 1140 is formed to reflect and approximately recollimate the optical pump radiation after it is input through the pump cavity window 1130. The approximately recollimated pump radiation is then reflected between the cylindrical boundaries of the integrated pump cavity, while gradually reflecting down the length of the gain medium. The first and second ends 1111 and 1112 may also be utilized to reflect pump radiation.

In the illustrated embodiment, the cylindrical shape is tapered by an angle 1150, so that the first end has a larger diameter that tapers to a smaller diameter at the second end. Accordingly, the optical pump radiation within the integrated pump cavity concentrates in a predetermined manner as it traverses the length of the cylinder, such as illustrated and described with respect to FIG. 2.

In order to provide a more efficient laser, the gain medium 1100 in one embodiment includes an inner region 1160 having an approximately cylindrical shape doped with an active pump absorptive ion at a predetermined level, and surrounding the inner region, an outer region 1170 is formed having a lesser doping concentration. In one embodiment the outer region has a doping concentration of approximately zero (i.e. the outer region is undoped). Advantageously, the stored energy is concentrated in the inner, more highly doped region, while the laser mode is allowed to extend into the undoped region, which reduces losses, which allows the lasing mode to be concentrated in the more highly doped inner region. This configuration can allow better control of the lasing mode within the gain medium.

Figure 12:
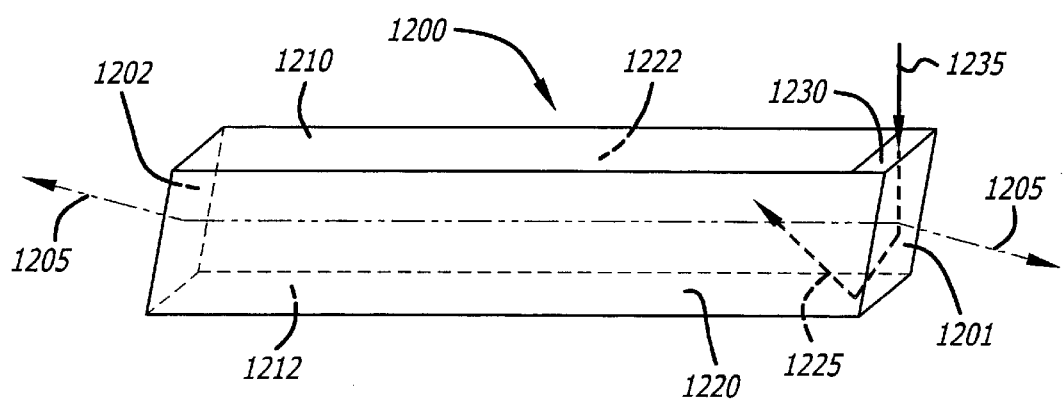
FIG. 12 is perspective view of an alternative embodiment in which the solid state gain medium comprises an approximately rectangular slab including angled ends.

Reference is now made to FIG. 12, which is a perspective view of a solid state gain medium shown generally at 1200, with an approximately rectangular cross-section but including first and second angled ends 1201 and 1202, which are angled with respect to the central axis of the rectangular solid. Due to refraction effects, an optical axis 1205 defined through this central axis is "bent" at the first and second ends 1201 and 1202. The pump cavity in the solid state gain medium 1200 is defined by an upper reflective surface 1210 and an oppositely-positioned lower reflective surface 1212, and a first and second flat lateral surface 1220 and 1222 arranged in an opposing parallel relationship. In some embodiments, both the upper and lower reflective surfaces are approximately parallel to the laser axis 1205. In other embodiments, the upper reflective surface and/or the lower reflective surface may comprise a taper angle such as described with reference to FIG. 2 or other suitable shape, which provides a concentrating pump cavity.

In order to inject the optical pump radiation 120 into the gain medium, a pump cavity window 1230 is formed on the upper surface proximate to the first end 1201. The angled first end 1201 is configured below the pump cavity window so that pump radiation injected within a range of angles about normal incidence is reflected therefrom and then into the pump cavity. For example, a ray 1235 injected at approximately normal incidence is reflected from the angled first end 1201 and then into the pump cavity.

Figure 13:
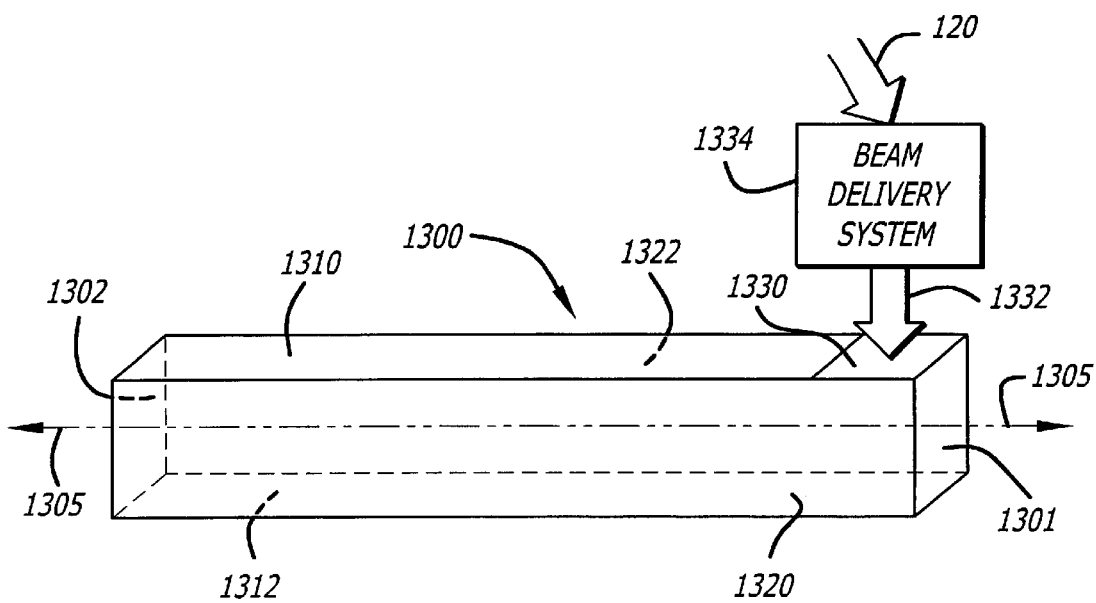
FIG. 13 is perspective view of still another alternative embodiment, in which the solid state gain medium comprises an approximately rectangular slab having approximately normal ends.

Reference is now made to FIG. 13, which is a perspective view of an approximately rectangular slab of solid state gain medium shown generally at 1300 including a first end 1301 and a second end 1302. A laser axis 1305 is defined between the first and second ends. An integrated pump cavity is defined in the solid state gain medium 1300 by a flat, upper reflective surface 1310, an oppositely-positioned, flat, lower reflective surface 1312, a flat, first lateral surface 1320 and an oppositely-positioned, flat, second lateral surface 1322 that is approximately parallel to the first lateral surface. In some embodiments, both the upper and lower reflective surfaces are approximately parallel to the laser axis 1305. In other embodiments, the upper reflective surface and/or the lower reflective surface may comprise a taper angle or other suitable shape such as described with reference to FIG. 2, which provides a concentrating pump cavity.

A pump cavity window 1330 is formed on the upper reflective surface 1310 proximate to a first end 1340, in order to inject an appropriate beam 1332 of optical pump radiation 120 supplied from the pump source 122 (FIG. 1) through a beam delivery system 1334. It may be noted that the embodiment of FIG. 13, unlike the embodiment of FIG. 1, does not include an optical surface 150 opposite the pump cavity window to recollimate the pump radiation and inject into the pump cavity. Therefore, if pump radiation is injected at normal incidence or within a certain range of injection angles around normal incidence, the pump beam rays lying within this range of angles will reflect at close to normal incidence from the lower surface and then exit through the pump cavity window, and as a result, these rays would be lost and unavailable to pump the gain medium. In order to prevent such loss of optical pump radiation, the beam delivery system 1334 is designed to create a beam of optical pump radiation with a predetermined angular profile, not including near normal incidence, so that by reflection from the lower surface and the first end, the pump radiation is injected into the integrated pump cavity.

Figure 14:
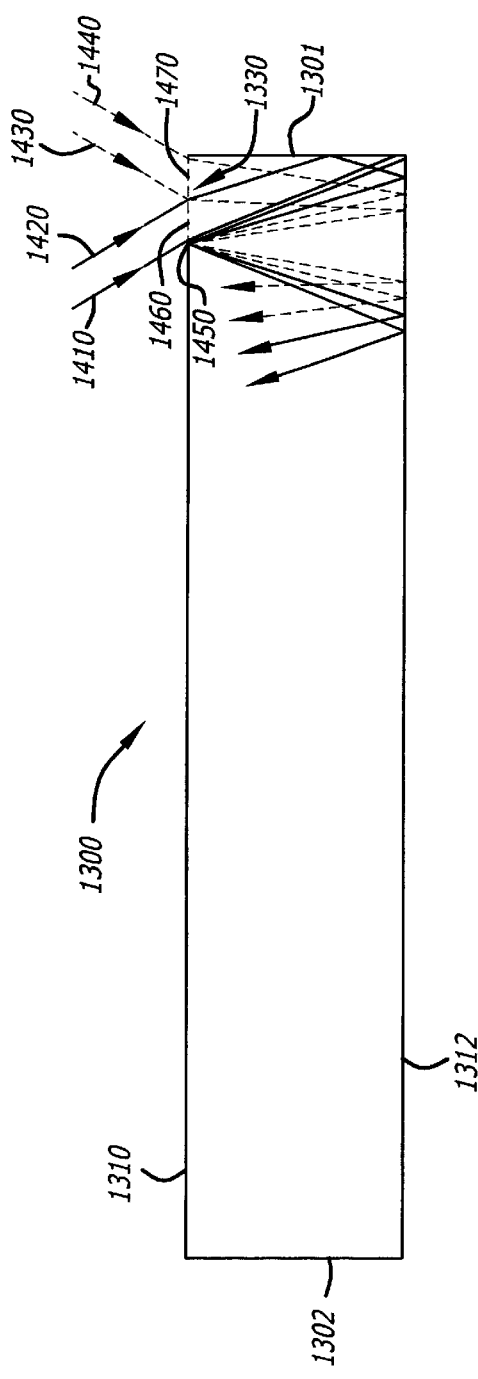
FIG. 14 is a cross-sectional diagram of the optically-pumped laser of FIG. 13 taken longitudinally, illustrating four rays of optical pump radiation input at various points of the pump cavity window.

FIG. 14 is a longitudinal cross-section of the rectangular slab of gain medium 1300, including rays that illustrate optical radiation injected into the integrated pump cavity defined within the gain medium 1300. Four rays, including a first, a second, a third, and a fourth ray 1410, 1420, 1430 and 1440 are shown. The first ray 1410 is incident upon the window 1330 adjacent to the reflective surface 1310, angled toward the first end 1301. The second ray is incident upon the window approximately in its center, angled toward the first end at a less steep angle than the first ray 1410. Both the first and second rays propagate through the window 1330 at an angle toward the first end 1301, then reflect from the first end, then reflect from the lower reflective surface 1312, and then arrive at a point 1450 on the upper reflective surface 1310 adjacent to the input window 1330. Once at the point 1450, it is clear that the first and second rays have been injected into the pump cavity. It can be seen that any pump radiation incident within a first window section 1460 between the first and second rays, and having a propagation angle greater than the first and second rays will be injected into the integrated pump cavity. However, even if a ray (not shown) is incident on the first window section, but the angle of incidence is less than that of the second ray, that other ray would not be injected into the pump cavity, but would be reflected back out through the window 1330.

The third ray 1430 is incident upon the window 1330 approximately at its center, angled toward the pump cavity and the second end 1302. The fourth ray 1440 is incident upon the window 1330 adjacent to the first end 1301, and is also angled toward the pump cavity, but at a greater angle than the second ray 1430. Both the third and fourth rays 1430 and 1440 reflect from the lower reflective surface 1312, and then arrive at the point 1350 adjacent to the window 1330, at which point it is clear that the third and fourth rays have been injected into the pump cavity. It can be seen that any pump radiation incident within a second window section 1470 between the third and fourth rays, and having a propagation angle greater than the third and fourth rays will be injected into the integrated pump cavity. However, if a ray (not shown) is incident at a location between the third and fourth rays, but the angle of incidence is less than that of the third ray, that other ray would not be injected into the pump cavity, but would be reflected back out through the window 1330.

Using a ray tracing analysis such as shown in FIG. 14, the beam delivery system 1334 (FIG. 13) can be designed for any particular embodiment to supply optical pump radiation to either or both of the first and second window sections 1460 and 1470 with the proper range of propagation angles to ensure that it is injected into the optical cavity. Therefore, the beam delivery system 1334 in FIG. 13 includes any appropriate components such as focusing optics, mirrors, optical fibers, or lens ducts to receive the beam from the pump source, process it as appropriate, and deliver it to the appropriate section of the pump cavity window 1330 with the appropriate directions of propagation.

Figure 15:
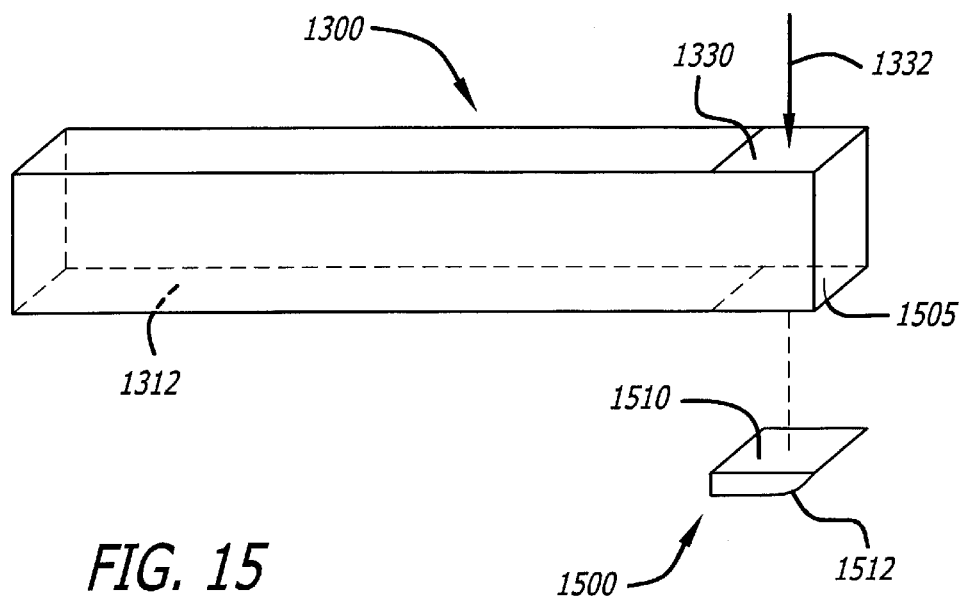
FIG. 15 is a perspective view of an embodiment of a solid state laser that comprises an external recollimator situated opposite the pump cavity window.

FIG. 15 is a perspective view of an alternative embodiment of FIG. 13 in which the laser assembly also includes an external recollimator 1500 situated opposite the pump cavity window 1330 to receive and reflect optical pump radiation into the integrated pump cavity. An access window 1505 is formed on the lower surface opposite the pump cavity window 1330 by appropriate coatings (e.g. anti-reflection coatings). The access window 1505 is configured to allow pump radiation injected through the pump cavity window 1330 to propagate through to the external recollimator 1500, and to allow optical radiation reflected from the external recollimator to be injected back into the gain medium. For illustrative purposes, the laser assembly in FIG. 15 is shown comprising the rectangular slab of FIG. 13; however, the external recollimating surface could be utilized with any other embodiment.

The external recollimator 1500 in FIG. 15 comprises a substrate 1510 and a curved reflective surface 1512 formed thereon. In some embodiments the substrate 1510 comprises an upper surface having a flat shape suitable for bonding to a corresponding flat surface of the lower surface 1312 of the solid state gain medium, but in other embodiments the substrate may be spaced apart from the gain medium. For example, a cylindrical reflective lens could be positioned appropriately to provide the external recollimator.

In FIGS. 1 and 3 the optical surface 150 was discussed, which in some embodiments can be treated as a recollimator integrated with the lower boundary. The external recollimator 1500 in FIG. 15 can operate in like manner as a recollimator integrated with the lower boundary to approximately recollimates the optical pump radiation injected through the pump cavity window. Accordingly, the curved reflective surface 1512 has an optical power and shape designed to recollimate or otherwise optically process the pump radiation received from the pump cavity window to provide the desired propagation direction. Like the integrated recollimator, the external recollimating surface 1500 allows the optical pump radiation to be injected at approximately normal incidence, which is an advantage over the embodiment disclosed in FIGS. 13 and 14. Also, the recollimating surface provides better control of the intensity distribution within the pump cavity than if it were omitted. One potential advantage of the external recollimator over the integrated recollimator is its cost: the external recollimator may simplify manufacturing and thereby reduce device cost. However, the integrated recollimator minimizes losses of optical pump radiation, and thereby the integrated recollimator provides a more efficient pumping configuration.

Figure 16:
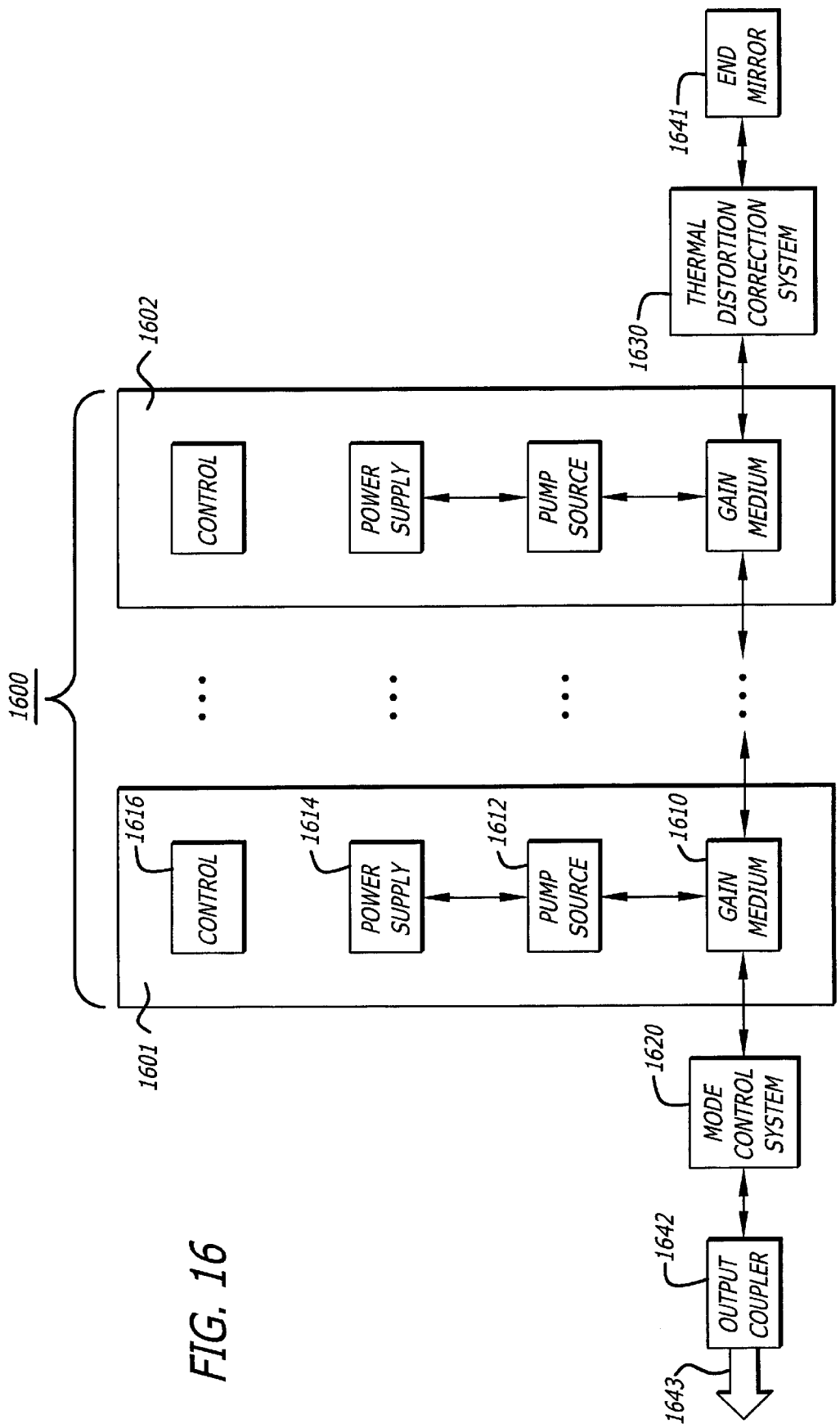
FIG. 16 is a block diagram of a laser implemented in a modular configuration including multiple solid state modules.

FIG. 16 is a block diagram of a modular embodiment of a laser system that includes multiple pumped gain medium modules, shown collectively at 1600, that operate to amplify a laser beam propagating therethrough. The gain medium modules include a first module 1601 and a second module 1602 arranged in any configuration, such as series, parallel, or a combination of series and parallel as suited for a particular application. Additional modules may be situated between the first and second modules. Advantageously, as many modules as desired can be added to generate a high power laser beam, which can be useful for high power laser welding, cutting, or drilling.

For purposes of illustration, the elements within only one module will be described, but it should be apparent that the other modules may contain similar elements. The first module 1601 incorporates a gain medium 1610 with the integrated pump cavity disclosed herein, a pump source 1612 such as a laser diode array arranged to pump the gain medium, a power supply 1614, and a control unit 1616 arranged to drive the power supply and control the laser diode and laser. In some embodiments, each module comprises a separate physical unit, with separate pump sources, power supplies, and control units. In alternative embodiments it may be useful to combine one or more of the pump sources, the power supplies, and/or the control unit.

The laser system in FIG. 16 also includes a mode control system 1620 that operates to control the mode of the laser beam, such as the mode control system 350 shown in FIG.

3, including optical components and any related control systems. The mode control system 1620 may comprise multiple groups of optical components, each controlling the mode of a respective module; alternatively, the mode control system may comprise a single group of optical components. The laser system in FIG. 16 also includes a thermal distortion correction system 1630 such as the cylindrical lens 345 shown in FIG. 3 that operates to correct beam distortions caused by thermal lensing within the gain media in the modules. The thermal distortion correction system may include multiple components, one for each module.

An optical extraction system is situated on either side of the modules to extract laser energy from the pumped gain media. In one embodiment, the optical extraction system comprises an end mirror 1641 and an output coupler 1642 having any suitable configuration to define a laser cavity. An output beam 1643 from the output coupler is directed by any suitable optical system to its intended use such as welding, drilling, or cutting.

Figure 17:
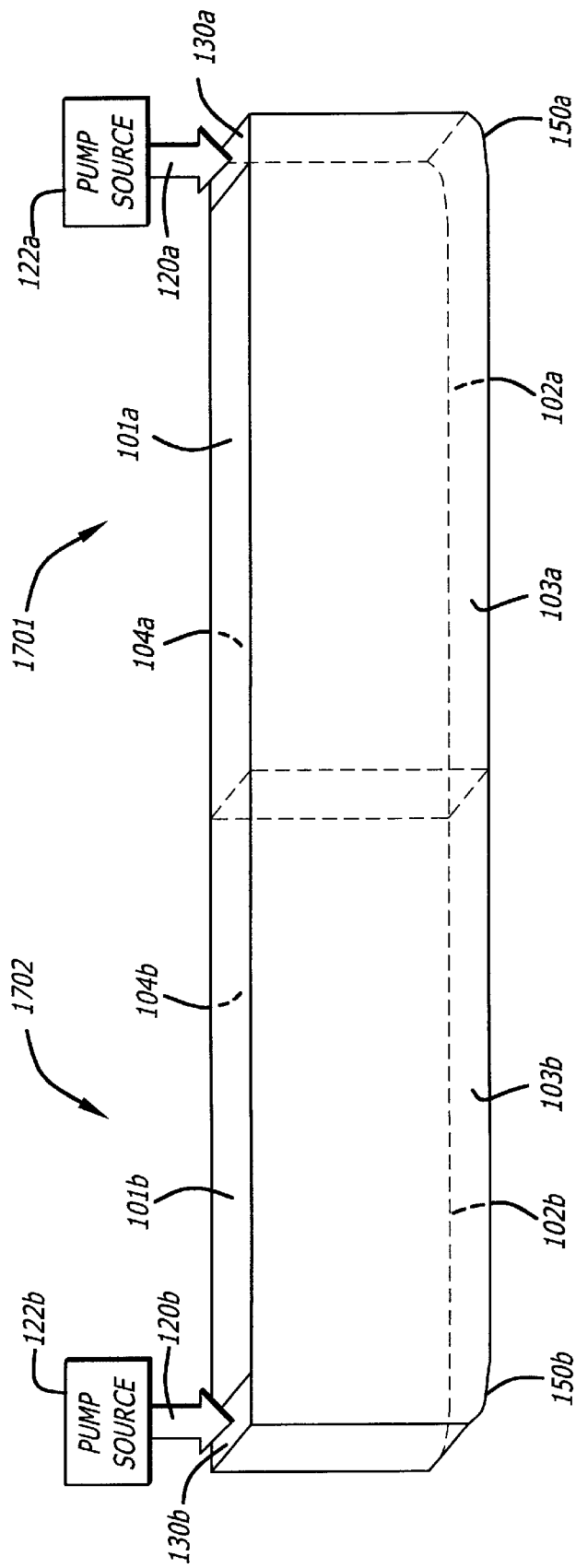
FIG. 17 is an alternative embodiment of a solid state gain medium with boundaries configured to provide an integrated pump cavity, including multiple pump cavity windows to input optical pump radiation.

FIG. 17 is an alternative embodiment of a solid state gain medium having boundaries configured to provide an integrated pump cavity, including multiple pump cavity windows to input optical pump radiation into the cavity. For ease of illustration, the embodiment of FIG. 17 resembles the embodiment of FIG. 1 in some respects; however it should be recognized that many alternative embodiments are possible. Particularly, the embodiment of FIG. 17 comprises a single slab that resembles a combination of two slabs of the solid state gain medium of FIG. 1 connected at their second ends. The embodiment of FIG. 17 utilizes structures corresponding to those in FIG. 1 including the pump cavity window 130, the upper boundary 101, the lower boundary 102, the first transverse boundaries 103, the second transverse boundary 104, and the recollimating reflective surface 150. For descriptive purposes, the solid state gain medium is divided into two regions, a first region 1701 and a second region 1702. The first region 1701 includes a pump cavity window 130a, an upper boundary 101a, a lower boundary 102a, a first lateral boundary 103a, and a second lateral boundary 104a. The first region 1701 is optically pumped by a pump beam 120a supplied from a suitable pump source 122a. A recollimating reflective surface 150a is situated opposite the pump cavity window 130a. The second region 1702 includes similar structures. The multiple pump cavity windows in the embodiment of FIG. 17 allow for pumping by multiple pump beams and multiple pump sources, which may be useful for injecting more optical pump power into the pump cavity than possible or practical with a single pump source input through a single window.

It will be appreciated by those skilled in the art, in view of these teachings, that alternative embodiments may be implemented without deviating from the spirit or scope of the invention. For example, the pump cavity window may be formed at a non-zero angle with the upper boundary, or it may have a non-flat optical shape. This invention is to be limited only by the following claims, which include all such embodiments and modifications when viewed in conjunction with the above specification and accompanying drawings.

What is claimed is:

1. An optically-pumped laser apparatus comprising:
    a gain medium having boundaries that define an integrated pump cavity including transverse boundaries;
    an optical system that defines a laser axis through a first end and a second end of said gain medium; and
    an optical pump source that supplies optical pump radiation to said gain medium in a direction transverse to the laser axis;
    said integrated pump cavity including means for concentrating input optical pump radiation as it propagates through the pump cavity and said concentrating means including first and second boundaries of said gain medium that are approximately non-parallel with respect to each other so that optical pump radiation reflects between said non-parallel boundaries whereby said integrated pump cavity is configured so that said optical pump radiation is substantially contained within said boundaries and absorbed by said gain medium, thereby energizing said gain medium to generate a laser emission along said laser axis.

2. The laser apparatus of claim 1, wherein said integrated pump cavity has a configuration for energizing said gain medium in an approximately uniform distribution.

3. The laser apparatus of claim 1 wherein said gain medium comprises an optically-coated solid state material.

4. The laser apparatus of claim 1, further comprising:
    a pump cavity window defined at a boundary of the gain medium, said pump window arranged to input said optical pump radiation into said gain medium; and
    an optical surface situated opposite said pump cavity window, said opposing optical surface having a configuration to concentrate said input optical pump radiation.

5. The laser apparatus of claim 4 and further comprising means for cooling said solid state gain medium to provide an approximately constant temperature on a first two of said transverse boundaries, and also to provide a predetermined temperature variation on a second two of said transverse boundaries, said cooling means including a heat sink coupled to said transverse boundaries of said solid state gain medium.

6. The laser apparatus of claim 3 wherein said solid state gain medium comprises Yb:YAG having a dopant concentration less than about 1%.

7. The laser apparatus of claim 3 wherein said solid state gain medium has an approximately rectilinear configuration.

8. The laser apparatus of claim 3 wherein said solid state gain medium has an approximately cylindrical configuration.

9. The laser apparatus of claim 4, further comprising:
    a second optical pump source that supplies second optical pump radiation;
    a second pump cavity window defined at a boundary of the gain medium, said second pump window arranged to input said second optical pump radiation into said gain medium; and
    a second optical surface situated opposite said second pump cavity window, said second optical surface having a configuration to concentrate said input optical pump radiation.

10. The laser apparatus of claim 4 wherein said opposing optical surface is formed in said gain medium.

11. The laser apparatus of claim 4 wherein said opposing optical surface is situated outside of said gain medium.

* * * * *